United States Patent
Russo et al.

(10) Patent No.: US 6,546,477 B1
(45) Date of Patent: Apr. 8, 2003

(54) MEMORY MANAGEMENT IN EMBEDDED SYSTEMS WITH DYNAMIC OBJECT INSTANTIATION

(75) Inventors: David A. Russo, Santa Barbara, CA (US); Robert E. Frankel, Goleta, CA (US)

(73) Assignee: Texas Instruments Incorporated, Dallas, TX (US)

(*) Notice: Subject to any disclaimer, the term of this patent is extended or adjusted under 35 U.S.C. 154(b) by 67 days.

(21) Appl. No.: 09/666,044

(22) Filed: Sep. 20, 2000

Related U.S. Application Data

(60) Provisional application No. 60/154,777, filed on Sep. 20, 1999, provisional application No. 60/154,657, filed on Sep. 20, 1999, and provisional application No. 60/154,656, filed on Sep. 20, 1999.

(51) Int. Cl.$^7$ ................................................ G06F 12/02
(52) U.S. Cl. ........................................ 711/170; 717/100
(58) Field of Search ................................ 711/170, 171, 711/172, 173, 153, 6; 717/100, 169, 175; 707/205; 709/104

(56) References Cited

U.S. PATENT DOCUMENTS 5,784,699 A * 7/1998 McMahon et al. .......... 711/170

OTHER PUBLICATIONS

Van Ommering, Rob, et al; *The Koala Component Model for Consumer Electronics Software*, IEEE Computer, vol. 33, Issue 3, Mar. 2000, pp. 78–85.

* cited by examiner

Primary Examiner—Hiep T. Nguyen
(74) Attorney, Agent, or Firm—Gerald E. Laws; W. James Brady, III; Frederick J. Telecky, Jr.

(57) ABSTRACT

A system and method is provided for enabling the reuse of algorithms in multiple application frameworks with no alterations required of the algorithm once it is developed. An inverted memory allocation mechanism enables various algorithm modules to be integrated into a single application without modifying the source code of the algorithm modules. A plurality of algorithm modules is combined with a framework to form the software program. Each of the plurality of algorithm modules has a memory interface which responds to a memory allocation inquiry with memory usage requirements of an instance of the algorithm module. The software program is then loaded on a hardware platform and executed. During execution, the framework sends a query to the memory interface of each of the plurality of algorithm modules to request memory usage requirements for each instance of each of the plurality of algorithm modules. A response is then sent from the memory interface of each algorithm module identifying memory usage requirements for each instance of the algorithm module. The framework then allocates a portion of memory to each algorithm module to instantiate each instance in accordance with the memory usage requirement identified by the memory interface of each algorithm module. Thus, each instance of the plurality of algorithm modules is instantiated and allocated memory dynamically.

19 Claims, 19 Drawing Sheets

```
501 ⎰  void FIR_init (void)
    ⎱  {
       } void FIR_exit (void)                FIG. 5
       {
       }
```

```
505 ⎰  typedef FIR_Params {    /* FIR_Obj creation parameters */
    ⎱      int frameLen ;       /* input/output frame length */
           int *coeff ;         /* pointer to filter coefficients */
       } FIR_Params ;

FIR_Params FIR_PARAMS = { 64, NULL } ;  /* default parameters */ typedef struct FIR_Obj { /* FIR_Obj definition */
           int hist [16] ;      /* previous input value */
           int frameLen ;       /* input frame length */
           int *coeff ;
       } FIR_Obj ;
```

```
       FIR_Handle FIR_create (FIR_Obj *fir, const FIR_Params *params)
       {
           if (fir != NULL) {
               if (params == NULL) {  /* use defaults if params is NULL */
                   params = &FIR_PARAMS ;
               }
502 ⎰          fir->frameLen = params->frameLen ;
    ⎱          fir->coeff = params->coeff ;
               memset(fir->hist, 0, sizeof (fir->hist)) ;
           } return (fir) ;
       }
```

```
503 ⎰  void FIR_delete (FIR_Handle fir)
    ⎱  {
       }
```

```
       void FIR_apply (FIR_Handle fir, int in[] , int out[] )
       {
           int i ;

/* filter data using coefficients fir->coeff and
504 ⎰          history fir->hist */
    ⎱      for (i = 0 ; i < fir->frameLen; i++) {
               out [i] = filter(in[i], fir->coeff, fir->hist) ;
           }
       }
```

FIG. 7A

```
/*----------------------------------*/
/* TYPES AND CONSTANTS */
/*----------------------------------*/
706 —  #define IALG_DEFMEMRECS 4        /* default number of memory records */
       #define IALG_OBJMEMREC  0        /* memory record index of instance object */
711 —  #define IALG_SYSCMD    256       /* minimum "system" IALG_Cmd value */
712 —  #define IALG_EOK        0        /* successful return status code */
713 —  #define IALG_EFAIL     -1        /* unspecified error return status code */ typedef enum IALG_MemAttrs {
           IALG_SCRATCH,                /* scratch memory */
709        IALG_PERSIST,                /* persistent memory */
           IALG_WRITEONCE               /* write-once persistent memory */
       } IALG_MemAttrs;

714 {  #define IALG_MPROG 0x0008        /* program memory space bit */
       #define IALG_MXTRN 0x0010        /* external memory space bit */

/*
 *  ===== IALG_MemSpace =====
 */
       typedef enum IALG_MemSpace {
           IALG_EPROG   = IALG_MPROG | IALG_MXTRN,   /* external program memory */
           IALG_IPROG   = IALG_MPROG,                /* internal program memory */
           IALG_ESDATA  = IALG_MXTRN = IALG_MXTRN + 0, /* off-chip data memory (accessed sequentially) */
           IALG_EXTERNAL = IALG_MXTRN + 1,           /* off-chip data memory (accessed randomly) */
708        IALG_DARAM0  = 0,                         /* dual access on-chip data memory */
           IALG_DARAM1  = 1,                         /* dual access on-chip data memory */
           IALG_SARAM   = 2,                         /* single access on-chip data memory */
           IALG_SARAM0  = 2,                         /* block 0, equivalent to IALG_SARAM */
           IALG_SARAM1  = 3                          /* block 1, if independant blocks required */
       } IALG_MemSpace;

typedef struct IALG_MemRec {
           Int size;                    /* 'sizeof' memory request in MAUs (minimum address-able unit) */
           Int alignment;               /* alignment requirement (in MAUs) */
710        IALG_MemSpace space;         /* allocation space */
           IALG_MemAttrs attrs;         /* memory attributes */
           Void *base;                  /* base address of allocated buf */
       } IALG_MemRec;
```

FIG. 7B

```
/*
 * ======== IALG_Obj ========
 * Algorithm instance object definition
 *
 * All XDAIS algorithm instance objects *must* have this structure as their first element.
 * However, they do not need to initialize it; initialization of this sub-structure is done by
 * the "framework".
 */
typedef struct IALG_Obj {
      struct IALG_Fxns *fxns;            } 705
} IALG_Obj;

/*
 * ======== IALG_Handle ========
 * Handle to an algorithm instance object
 */
typedef struct IALG_Obj *IALG_Handle;    } 707
/*
 * ======== IALG_Params ========
 * Algorithm instance creation parameters
 * All XDAIS algorithm parameter structures *must* have a this as their first element.
 */
typedef struct IALG_Params {
      Int size; /* number of MAUs (i.e. the 'sizeof') the structure */  } 703
} IALG_Params;

/*
 * ======== IALG_Status ========
 * Pointer to algorithm specific status structure
 * All XDAIS algorithm status structures *must* have this as their first element.
 */
typedef struct IALG_Status {
      Int size; /* number of MAUs (i.e. the 'sizeof') the structure */  } 704
} IALG_Status;

/*
 * ======== IALG_Cmd ========
 * Algorithm specific command. This command is used in conjunction with IALG_Status to
 * get and set algorithm specific attributes via the algControl method.
 */
typedef unsigned int IALG_Cmd;
```

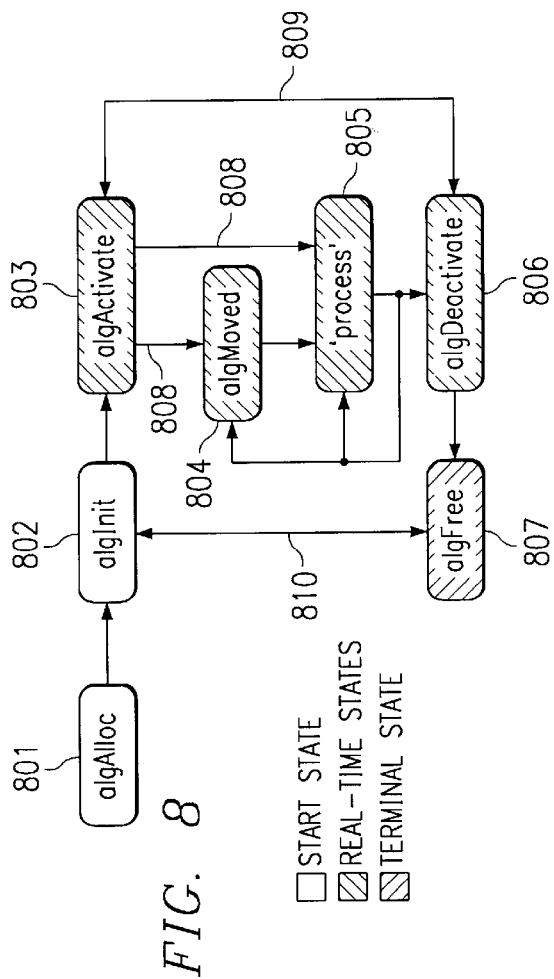

```
typedef struct IALG_Fxns {
    Void        *implementationId;         ~702
    Void        (*algActivate) (IALG_Handle) ;
    Int         (*algAlloc) (const IALG_Params *, struct IALG_Fxns **, IALG_MemRec *) ;
    Int         (*algControl) (IALG_Handle, IALG_Cmd, IALG_Status *) ;
    Void        (*algDeactivate) (IALG_Handle) ;
    Int         (*algFree) (IALG_Handle, IALG_MemRec *) ;
    Int         (*algInit) (IALG_Handle, const IALG_MemRec *, IALG_Handle, const
    IALG_Params *) ;
    Void        (*algMoved) (IALG_Handle, const IALG_MemRec *, IALG_Handle, const
    IALG_Params *) ;
    Int         (*algNumAlloc) (Void) ;
} IALG_Fxns;
```

```
client ()
{
    FIR_Params stdParams;
    FIR_TI_Params tiParams;

stdParams = FIR_PARAMS;              /* initialize all fields to defaults */
    stdParams.coeff = ...;               /* initialize selected parameters */
    fxns->algAlloc(&stdParams, ...) ;    /* pass parameters to algorithm */ tiParams = FIR_TI_PARAMS;            /* initialize all fields to defaults */
    tiParams.coeff = ...;                /* initialize selected parameters */
    fxns->algAlloc(&tiParams, ...) ;     /* pass parameters to algorithm */
}
Int FIR_TI_algAlloc(IALG_Params *clientParams, ...)
{
    FIR_TI_Params params = FIR_TI_PARAMS;

/* client passes in parameters, use them to override defaults */
    if (clientParams != NULL) {
    memcpy(&params, clientParams, clientParams->size) ;

}

/* use params as the complete set of parameters */
        :
}
```

FIG. 11

```
Void FIR_apply (FIR_Handle alg, Int *in[], Int *out[] )
{
    /* do app specific initialization of scratch memory */
    if (alg->fxns->ialg.algActivate != NULL) {
      alg->fxns->ialg_algActivate(alg) ;
    }
    /* filter data */
    alg->fxns->filter(alg, in, out) ;

/* do app specific store of persistent data */
    if (alg->fxns->ialg.algDeactivate != NULL) {
      alg->fxns->ialg.algDeactivate(alg) ;
    }
}
```

FIG. 10

```
define MAXMEMRECS  16 typedef struct ALG_Obj {
    IALG_Fxns    fxns;                  /* algorithm functions */
} ALG_Obj;
```

1001
```
IALG_Handle ALG_create (IALG_Fxns *fxns, IALG_Params *params)
{
    IALG_MemRec  memTab [MAXMEMRECS] ;
    IALG_Handle  alg = NULL;
    Int          n;

if (fxns->algNumAlloc () <= MAXMEMRECS) {
        n = fxns->algAlloc(params, memTab) ;
        if (allocMemory(memTab, n)) {
            alg = (IALG_Handle)memTab[0] .base;
            alg->fxns = fxns ;
            if (fxns->algInit(alg, memTab, params) != IALG_EOK) {
                fxns->algFree(alg, memTab) ;
                freeMemory(memTab, n) ;
                alg = NULL;
            }
        }
    }
    return (alg) ;
}
```

1002
```
Void ALG_delete (IALG_Handle alg)
{
    IALG_MemRec memTab [MAXMEMRECS] ;
    Int n;

n = alg->fxns->algFree(alg, memTab) ;
    freeMemory(memTab, n) ;
}
```

FIG. 12

```
typedef struct EncoderObj {
    IALG_Obj ialgObj;        /* IALG object MUST be first field */
    Int *workBuf;            /* pointer to on-chip scratch memory */
    Int *historyBuf;         /* previous frame's data in ext mem */
    ... ;
} EncoderObj ;

Void algActivate (IALG_Handle handle)
{
    EncoderObj *inst = (EncoderObj *)handle;

/* copy history to beginning of on-chip working buf */
    memcpy(inst->workingBuf, inst->histBuf, HISTSIZE) ;
}                                                                          ⎫ 1201

Void encode (IALG_Handle handle,
             Void *in[] , Void *out[] )
{
    EncoderObj *inst = (EncoderObj *) handle;

/* append input buffer to history in on-chip workBuf */
    memcpy (inst->workBuf + HISTSIZE, in HISTSIZE) ;

/* encode data */
    ...
    /* move history to beginning of workbuf for next frame */
    memcpy (inst->workBuf, inst->workingBuf + FRAMESIZE, HISTSIZE) ;
}

Void algDeactivate (IALG_Handle handle)
{
    EncoderObj *inst = (EncoderObj *) handle;

/* save beginning of on-chip workBuf to history */
    memcpy (inst->histBuf, inst->workingBuf, HISTSIZE) ;                   ⎫ 1202
```

FIG. 13

```
typedef struct EncoderObj {
    IALG_Obj    ialgObj;        /* IALG object MUST be first field */
    Int         *workBuf;       /* pointer to on-chip scratch memory */
    Int         workBufLen;     /* expressed in words per frame */
    ...
} EncoderObj;

typedef struct EncoderParams {
    Int frameDuration;          /* expressed in ms per frame */
    ...
};
EncoderParams ENCODERATTRS = {5};   /* default parameters */

Int algAlloc(IALG_Params *algParams, IALG_Fxns **p, IALG_MemRec memTab[] )
{
    EncoderParams *params = (EncoderParams *)algParams;
    if (params == NULL) {                       /* use default parameters */
        params = &ENCODERATTRS;
    } memTab[0].size = sizeof (EncoderObj) ;
    memTab[0].alignment = 1;
    memTab[0].type = IALG_PERSIST;        ⌐1301
    memTab[0].space = IALG_EXTERNAL;      ⌐1302 memTab[1].size = params->frameDuration * 8 * sizeof(int) ;
    memTab[1].alignment = 1;                    /* no alignment */
    memTab[1].type = IALG_PERSIST;        ⌐1303
    memTab[1].space = IALG_DARAM;         ⌐1304   /* dual-access on-chip */ return (2);
}
```

FIG. 14

```
typedef struct EncoderStatus {
    Bool voicePresent;  /* voice in current frame? */
    ... ;
} EncoderStatus;

typedef enum {EncoderGetStatus, ...} EncoderCmd;

Void algControl (IALG_Handle handle,
                 IALG_Cmd cmd, IALG_Status *status)
{
    EncoderStatus *sptr = (EncoderStatus *)status;

switch ((EncoderCmd)cmd) {
        case EncoderGetStatus:
            sptr->voicePresent = ...;

...
        case EncoderSetMIPS:
            ...
    }
}
```

FIG. 15

```
typedef struct EncoderObj {
    IALG_Obj   ialgObj                          /* IALG object MUST be first field */
    Int        *workBuf;
    Int        workBufLen;
    ... ;
} EncoderObj;
Int algFree(IALG_Handle handle, IALG_MemRec memTab[] )
{
    EncoderObj *inst = (EncoderObj *)handle;

algAlloc(NULL, memTab) ;                    /* get default values first */ memTab[1] .size = inst->workBufLen * sizeof(Int) ;
    memTab[1] .base = (Void *)inst->workBuf;
    return(2);
}

Int algAlloc(IALG_Params *params, IALG_MemRec memTab[] )
{
    memTab[0] .size = sizeof (EncoderObj) ;
    memTab[0] .alignment = 1;
    memTab[0] .type = IALG_PERSIST;
    memTab[0] .space = IALG_EXTERNAL;

memTab[1] .size = 80;                       /* 10ms @ 8KHz */
    memTab[1] .alignment = 1;                   /* no alignment */
    memTab[1] .type = IALG_PERSIST;
    memTab[1] .space = IALG_DARAM;              /* dual-access on-chip */ return (2) ;
}
```

FIG. 16

```
typedef struct EncoderObj {
    IALG_Obj    ialgObj        /* IALG object MUST be first field */
    Int         workBuf;       /* pointer to on-chip scratch memory */
    Int         workBufLen;    /* workBuf length (in words) */
    ... ;
} EncoderObj ;

Int algInit(IALG_Handle handle,
        IALG_MemRec memTab[], IALG_Handle p, IALG_Params *algParams)
{
    EncoderObj *inst = (EncoderObj *)handle;
    EncoderParams *params = (EncoderParams *)algParams;

if (params == NULL) {
        params = &ENCODERATTRS;       /* use default parameters */
    } inst->workBuf = memTab[1] .base;
    inst->workBufLen = params->frameDuration * 8;
    ...

return (IALG_EOK) ;
}
```

FIG. 17

```
typedef struct EncoderObj {
    IALG_Obj    ialgObj       /* IALG object MUST be first field */
    int         workBuf;      /* pointer to on-chip scratch memory */
    Int         workBufLen;   /* workBuf length (in words) */
    ... ;
} EncoderObj ;

algMoved(IALG_Handle handle,
            IALG_Params *algParams, IALG_MemRec memTab[] )
{
    EncoderObj *inst = (EncoderObj *)handle;

inst->workBuf = memTab[1] .base;
}
```
1701

FIG. 18

```
#define NUMBUF  3       /* max number of my memory requests */
extern IALG_Fxns *subAlg;  /* sub-algorithm used by this alg */
```

1801
```
Int algNumAlloc(Void)
{
    return (NUMBUF + subAlg->algNumAlloc()) ;
}
```

```
Int algAlloc(const IALG_Params *p, struct IALG_Fxns **pFxns,
             IALG_MemRec memTab)
{
    Int n;

/* initialize my memory requests */
    ...
    /* initialize sub-algorithm's requests */
    n = subAlg->algAlloc(..., memTab) ;
    return (n + NUMBUF) ;
}
```

FIG. 19

```
/*------------------------*/
/*   TYPES AND CONSTANTS  */
/*------------------------*/
#define IRTC_ENTER    0
#define IRTC_CLASS1   1
#define IRTC_CLASS2   2
#define IRTC_CLASS3   3
#define IRTC_CLASS4   4
#define IRTC_CLASS5   5
#define IRTC_CLASS6   6
#define IRTC_CLASS7   7

/*
 * ======== IRTC_Handle ========
 * Handle to module's trace instance object
 */
typedef struct IRTC_Obj *IRTC_Handle;

/*
 * ========IRTC_Mask ========
 */
typedef LgUns IRTC_Mask ;

/*
 * ========IRTC_Fxns ========
 */
```

1901
```
typedef struct IRTC_Fxns {
    Void     *implementationId;
    Void     (*rtcBind) (LOG_Obj *log) ;
    IRTC_Mask (*rtcGet) (IRTC_Handle) ;
    Void     (*rtcSet) (IRTC_Handle, IRTC_Mask mask) ;
} IRTC_Fxns;
```

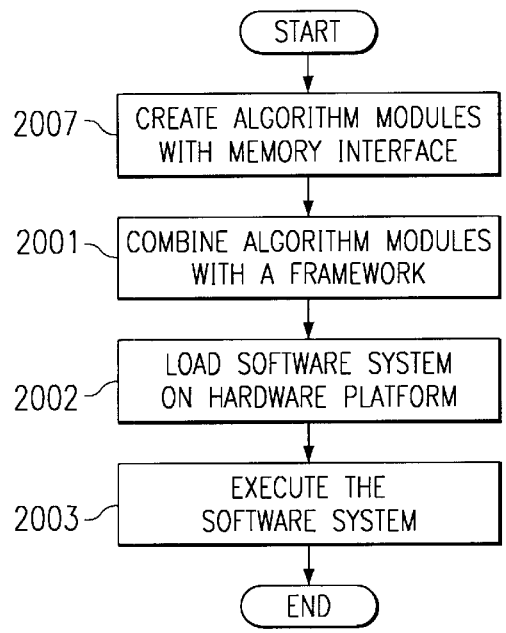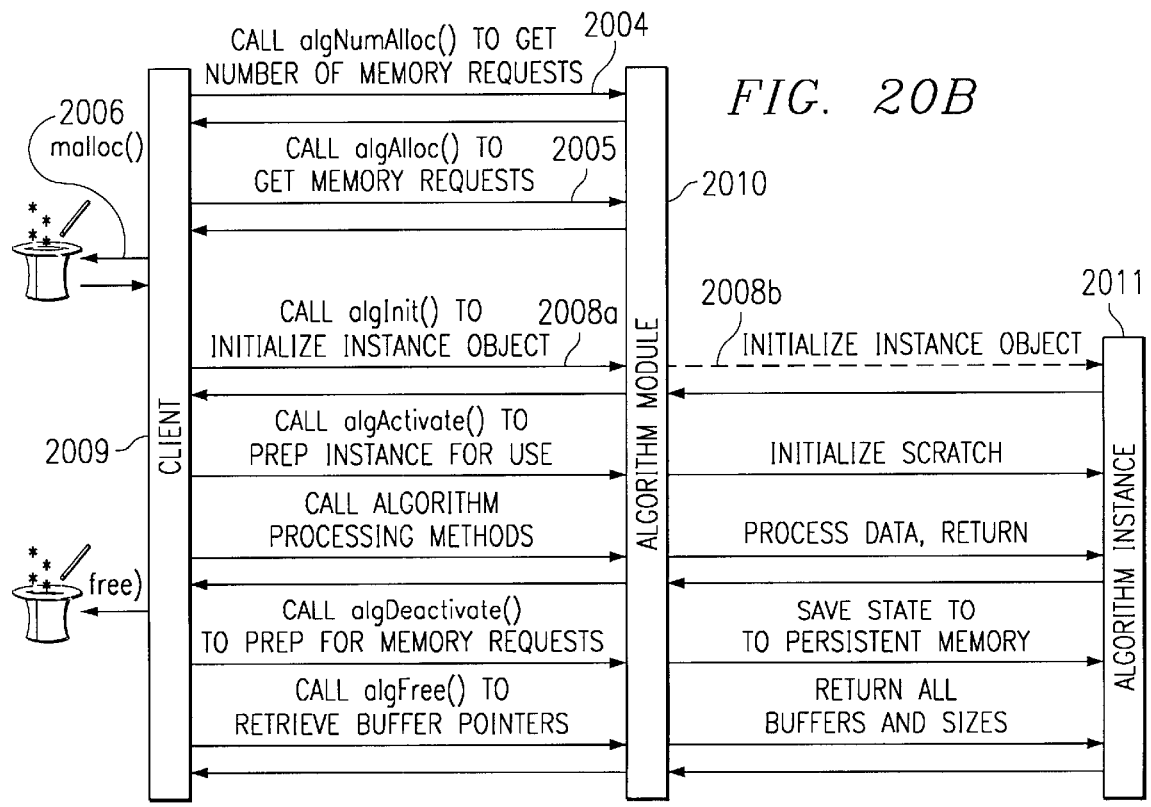

MEMORY MANAGEMENT IN EMBEDDED SYSTEMS WITH DYNAMIC OBJECT INSTANTIATION

CROSS REFERENCE TO RELATED APPLICATIONS

This application claims priority to provisional application Serial No. 60/154,777 filed Sep. 20, 1999, provisional application Serial No. 60/154,657 filed Sep. 20, 1999, and provisional application Serial No. 60/154,656 filed Sep. 20, 1999, and is related to application Ser. No. 09/667,393 and application Ser. No. 09/666,699.

Appendix A containing a computer program listing is submitted on two identical compact disks. Each compact disk contains the file Appendix A.txt. The file was created on Sep. 11, 2002 and is 40 KB bytes in size. Appendix A is hereby incorporated by reference.

TECHNICAL FIELD OF THE INVENTION

The present invention relates to embedded software systems, and more particularly to component and object-oriented programming models for embedded systems.

BACKGROUND OF THE INVENTION

Advances in digital signal processor (DSP) technology in the application areas of telephony, imaging, video, and voice are often results of years of intensive research and development. For example, algorithm standards for telephony have taken years to develop. The implementation of these DSP algorithms is often very different from one application system to another because systems have, for example, different memory management policies and I/O handling mechanisms. Because of the lack of consistent system integration or programming standards, it is generally not possible for a DSP implementation of an algorithm to be used in more than one system or application without significant reengineering, integration, and testing.

Digital Signal Processors (DSPs) are often programmed like "traditional" embedded microprocessors. That is, they are programmed in a mix of C and assembly language, directly access hardware peripherals, and, for performance reasons, almost always have little or no standard operating system support. Thus, like traditional microprocessors, there is very little use of Commercial Off-the-Shelf (COTS) software components for DSPs.

However, unlike general-purpose embedded microprocessors, DSPs are designed to run sophisticated signal processing algorithms and heuristics. For example, they may be used to detect DTMF digits in the presence of noise, to compress toll quality speech by a factor of 20, or for speech recognition in a noisy automobile traveling at 65 miles per hour.

Such algorithms are often the result of many years of doctoral research. However, because of the lack of consistent standards, it is not possible to use an algorithm in more than one system without significant reengineering. Since few companies can afford a team of DSP PhDs and the reuse of DSP algorithms is so labor intensive, the time-to-market for a new DSP-based product is measured in years rather than months.

Most modern DSP system architectures can be logically partitioned into algorithms, core run-time support and a framework that integrates the algorithms with the hardware and software comprising the system. The framework defines a component model with which the algorithms must comply.

The framework includes a device independent I/O sub-system and specifies how algorithms interact with this sub-system. For example, does the algorithm call functions to request data or does the framework call the algorithm with data buffers to process? The framework also defines the degree of modularity within the application; i.e., what components can be replaced, added, removed, and when components can be replaced (compile time, link time, or real-time). Unfortunately, for performance reasons, many DSP system architectures do not enforce a clear line between algorithm code and the framework. Thus, it is not possible to easily use an algorithm in more than one system.

Even within the telephony application space, there are a number of different frameworks available and each is optimized for a particular application segment; e.g., large volume client-side products and low volume high-density server-side products. Given the large number of incompatibilities between these various frameworks and the fact that each framework has enjoyed success in the market, any model for algorithm reuse should ideally make few requirements on existing frameworks.

Careful inspection of the various frameworks in use reveals that, at some level, they all have "algorithm components". While there are differences in each of the frameworks, the algorithm components share many common attributes: algorithms are C callable; algorithms are reentrant; algorithms are independent of any particular I/O peripheral; and, algorithms are characterized by their memory and instruction processing rate (MIPS) requirements. In approximately half of the known available frameworks, algorithms are also required to simply process data passed to the algorithm. The others assume that the algorithm will actively acquire data by calling framework-specific hardware independent I/O functions. Generally, algorithms are designed to be independent of the I/O peripherals in the system.

Given the similarities between the various frameworks, a need has arisen to create a model permitting simple reuse at the level of the algorithm. Moreover, there is real benefit to the framework vendors and system integrators from such a model: algorithm integration time will be reduced; it will be possible to easily comparison shop for the "best" algorithm; and more algorithms will be available.

A huge number of DSP algorithms are needed in today's marketplace, including modems, vocoders, speech recognizers, echo cancellation, and text-to-speech. It is not easy (or even possible) for a product developer who wants to leverage this rich set of algorithms to obtain all the necessary algorithms from a single source. On the other hand, integrating algorithms from multiple vendors is often impossible due to incompatibilities between the various implementations. To break this catch-22, algorithms from different vendors must inter-operate.

Dozens of distinct third-party DSP frameworks exist in the telephone vertical market alone. Each vendor has hundreds and sometimes thousands of customers. Yet, no one framework dominates the market. To achieve the goal of algorithm reuse, the same algorithm must be usable in all frameworks with minor impact on the framework implementation.

Marketplace fragmentation by various frameworks has a legitimate technical basis. Each framework optimizes performance for an intended class of systems. For example, client systems are designed as single-channel systems with limited memory, limited power, and lower-cost DSPS. As a result, they are quite sensitive to performance degradation.

Server systems, on the other hand, use a single DSP to handle multiple channels, thus reducing the cost per channel. As a result, they must support a dynamic environment. Yet, both client-side and server-side systems may require exactly the same vocoders.

Algorithms must be deliverable in binary form both to protect the vendor's intellectual property and to improve the reusability of the algorithm. If source code were required, all frameworks would require re-compilation. This would destabilize the frameworks and version control for the algorithms would be close to impossible.

Each particular implementation of a system (such as a speech detector) represents a complex set of engineering trade-offs between code size, data size, MIPS, and quality. Moreover, depending on the system designed, the system integrator may prefer an algorithm with lower quality and a smaller footprint to one with higher quality detection and a larger footprint (such as an electronic toy doll vs. a corporate voice mail system). Thus, multiple implementations of exactly the same algorithm sometimes make sense. There is no single best implementation of many algorithms.

Unfortunately, the system integrator is often faced with choosing all algorithms from a single vendor to ensure compatibility between the algorithms and to minimize the overhead of managing disparate APIs. Moreover, no single algorithm vendor has all the algorithms for all their customers. The system integrator is, therefore, faced with selecting a vendor that has "most" of the required algorithms and negotiating with that vendor to implement the remaining algorithms.

Most modern DSP hardware architectures include both on-chip data memory and off-chip memory. The performance difference between these is so large that algorithm vendors design their code to operate within the on-chip memory as much as possible. Since the performance gap is expect to increase dramatically in the next 3–5 years, this trend will continue for the foreseeable future.

While the amount of on-chip data memory in a given DSP architecture may be adequate for each algorithm in isolation, the increased number of MIPS available on modern DSPs enables the creation of complex software systems that perform multiple algorithms concurrently on a single chip. There may not be enough on-chip memory to allow all algorithms to have their full, required complement of data memory resident in on-chip memory concurrently. There is a need for a method to permit efficient sharing of this resource among the algorithms. Generally, prior art methods for memory sharing in a complex system have required that an algorithm be partially or substantially rewritten each time it was used in a new framework. This situation makes it very costly, both in time and money, for a third party algorithm vendor to provide algorithms for multiple frameworks.

SUMMARY OF THE INVENTION

An illustrative embodiment of the present invention seeks to provide a system and method for enabling the reuse of algorithms in multiple application frameworks with no alterations required of the algorithm once it is developed. Aspects of the invention are specified in the claims.

In an embodiment of the present invention, an algorithm component model enables many of the benefits normally associated with object-oriented and component-based programming but with little or no overhead. An inverted memory allocation mechanism enables various algorithm modules to be integrated into a single application without modifying the source code of the algorithm modules. The embodiment also includes naming conventions to prevent external name conflicts, a uniform method for initializing algorithms, a uniform trace and diagnostic interface, and a uniform packaging specification.

In this embodiment of the present invention, a method is provided for managing memory usage in a software program having a framework and a plurality of algorithm modules.

The plurality of algorithm modules is combined with the framework to form the software program, wherein each of the plurality of algorithm modules has a memory interface which responds to a memory allocation inquiry with memory usage requirements of an instance of the algorithm module. The software program is then loaded on a hardware platform and executed. During execution, the framework sends a query to the memory interface of each of the plurality of algorithm modules to request memory usage requirements for each instance of each of the plurality of algorithm modules. A response is then sent from the memory interface of each algorithm module identifying memory usage requirements for each instance of the algorithm module. The framework then allocates a portion of memory to each algorithm module to instantiate each instance in accordance with the memory usage requirement identified by the memory interface of each algorithm module. Thus, each instance of the plurality of algorithm modules is instantiated and allocated memory dynamically.

Another embodiment of the present invention is a software program that has a plurality of algorithm modules linked to a framework. Each of modules includes a memory interface that is operable to respond with a memory usage requirements of the algorithm when the memory interface is queried by a framework. The framework allocates memory to each instance of each algorithm module in accordance to a response to the query from each module.

Another embodiment of the present invention is a digital system with a program stored in non-volatile memory. The software program has a plurality of algorithm modules linked to a framework. Each of modules includes a memory interface that is operable to respond with memory usage requirements of the algorithm when the memory interface is queried by a framework. The framework allocates memory to each instance of each algorithm module in accordance to a response to the query from each module.

In another embodiment, the digital system is a cellular telephone.

In the following description, specific information is set forth to provide a thorough understanding of the present invention.

These and other features of the invention that will be apparent to those skilled in the art from the following detailed description of the invention, taken together with the accompanying drawings.

DESCRIPTION OF THE DRAWINGS

FIG. 5 is a code listing illustrating example code for a very simple module of FIG. 4;

FIGS. 7A, 7B and 7C together are a code listing illustrating code for an example of an abstract algorithm instance (IALG) interface for the component model of FIG. 3;

FIG. 8 is a flow graph illustrating the use of a memory interface function of an algorithm module that is an embodiment of the present invention;

FIG. 9 is a code listing with code fragments to illustrate how a framework may use the same style of parameter passing whether passing generic parameters or implementation-specific parameters to an algorithm module within the flow of FIG. 8;

FIG. 10 is a code listing illustrating generic create and delete functions a framework may use to create run-time instances of an algorithm in the component model of FIG. 3;

FIG. 11 is a code listing illustrating an optional activate/deactivate feature for a memory interface to enable memory sharing if a framework supports it for the flow of FIG. 8;

FIG. 12 is a code listing with example implementations of the activate and deactivate functions of FIG. 11;

FIG. 13 is a code listing of an example implementation of a function algAlloc( ) that returns a table of memory records that describe the size, alignment, type and memory space of all buffers required by an algorithm instance in the flow of FIG. 8;

FIG. 14 is a code listing of an example implementation of a function algControl( ) to allow a framework to call a specific function in an algorithm;

FIG. 15 is a code listing of an example implementation of a function algFree( ) that returns a table of memory records that describe the base address, size, alignment, type, and memory space of all buffers previously allocated for an algorithm instance in the flow of FIG. 8;

FIG. 16 is a code listing of an example implementation of a function algInit( ) that performs all initialization necessary to complete the run-time creation of an algorithm's instance object in the flow of FIG. 8;

FIG. 17 is a code listing of an example implementation of a function algMoved( ) that performs any reinitialization necessary to insure that all internal data references are recomputed after a framework relocates an algorithm at run-time in the flow of FIG. 8;

FIG. 18 is a code listing of an example implementation of a function algNumAlloc( ) that allows a framework to determine the maximum number of memory requests an algorithm instance may make;

FIG. 19 is a code listing of an example a uniform trace and diagnostic (IRTC) interface for an algorithm module in an alternative embodiment of the component model of FIG. 3;

FIGS. 20A and 20B together are a flow graph of a method for dynamic object instantiation with the component model of FIG. 3;

Corresponding numerals and symbols in the different figures and tables refer to corresponding parts unless otherwise indicated.

DETAILED DESCRIPTION OF THE INVENTION

Figure 1A:
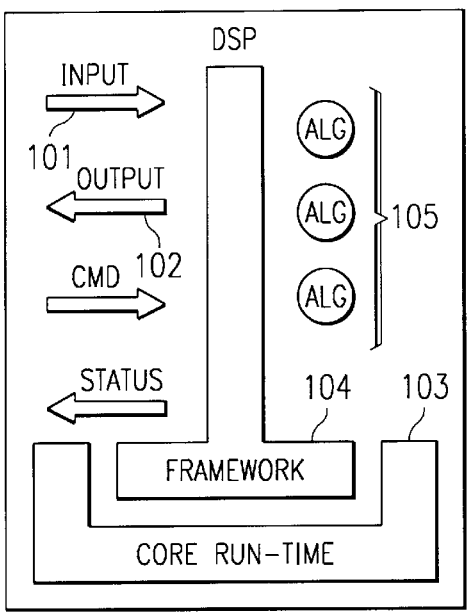
FIG. 1A is a block diagram illustrating the architecture of an embedded system with a framework and multiple algorithm modules that embodies the present invention.

Many modern DSP software system architectures can be partitioned along the lines depicted in FIG. 1A. Algorithms 105 are "pure" data transducers; i.e., they simple take input data buffers 101 and produce some number of output data buffers 102. Core run-time support 103 includes functions that copy memory, functions to enable and disable interrupts, and real-time debugging aids. Framework 104 is the "glue" that integrates algorithms 105 with real-time data sources 101 and sinks 102 using core run time support 103, to create a complete DSP sub-system. Framework 104 in essence defines a component model with which algorithms 105 must comply. Framework 104 interacts with any real-time peripherals (including other processors in the system) and defines the I/O interfaces for the algorithms 105.

It has now been discovered that several technical issues have prevented the creation of such a method. One major issue is that algorithm implementations to date have been responsible for managing their own memory usage. If an algorithm is to be used in a variety of applications, the framework rather than the algorithm must make decisions about memory usage and preemption. This is referred to as an inverted memory protocol herein.

The algorithms and framework are implemented using a software development system that provides an assembler, compiler, linker, debugger, and other tools. Associated with the compiler will be language run-time support that will be incorporated into an application when it is constructed with the linker. For DSP software development, the development system may also include a DSP operating system to be used when creating an embedded software system. This operating system would be incorporated into the embedded software system when it is constructed with the linker. Once the embedded software system is constructed, it is downloaded onto a target DSP hardware system to be debugged. A debug environment in the software development system connects high level debugging software executing on a host computer to a low level debug interface supported by a target device.

Figure 1B:
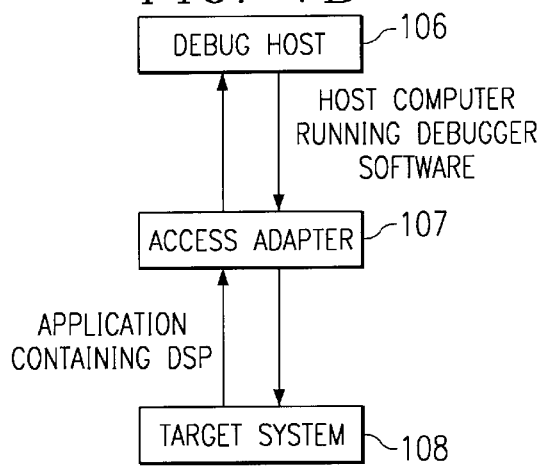
FIG. 1B is a block diagram illustrating a development system that is used to create an embedded system.

FIG. 1B illustrates a software development system connected to a target hardware system that contains a DSP. This development environment has three parts: development host 106, access adapter 107, and target system 108.

Development Host 106 is a computer, for example a PC, running a DSP specific software debugger as one of its tasks. The debugger allows the user to issue high level commands such as "set breakpoint at location 0x6789", "step one instruction" or "display the contents of memory from 0x1000 to 0x1048". An example host system is described fully in U.S. Pat. No. 5,329,471.

Access Adapter 102 is a hardware component that connects development host 100 to a target system. It utilizes one or more hardware interfaces and/or protocols to convert messages created by user interface commands to the debug command. This component could be a Texas Instruments XDS 510WS controller, for example, connected to the target system debug interface and to the PC through a SCSI port. An alternate configuration is a Texas Instruments XDS 510 controller installed in a PC connected to the target system debug interface. An example access adapter is described fully in U.S. Pat. No. 5,329,471.

Target System 108 is comprised of one or more DSPs. The DSP(s) contain hardware designed explicitly to ease the chore of debugging. It is the lowest element of the system debug environment. The DSP debug facilities allow the user to control the program execution, examine the state of the system, memory, and core resources in both real-time and stop mode debug modes. Target System 104 may be a cellular telephone, for example. Once a software program is written, compiled, linked and loaded onto the target system, it is then debugged and refined. Advantageously, a software program that embodies the present invention can be developed in a manner that minimizes debugging and redesign.

By enabling system integrators to "plug-replace" one algorithm for another, the time to market is reduced because the system integrator can choose algorithms from multiple vendors. A huge catalog of inter-operable parts from which any system can be built can be easily created.

These algorithms must meet the following requirements:

Algorithms from multiple vendors can be easily integrated into a single system.

Algorithms are framework agnostic. That is, the same algorithm can be efficiently used in virtually any application or framework.

Algorithms can be deployed in purely static as well as dynamic run-time environments.

Algorithms can be deployed in preemptive or non-preemptive multitasking environments.

Algorithms can be distributed in binary form.

Integration of algorithms does not require recompilation of the client application; re-configuration and re-linking may be required, however.

Table 1 defines various terms that will be used herein.

TABLE 1

Term Definitions

| | |
|---|---|
| Abstract Interface | An interface defined by a C header whose functions are specified by a structure of function pointers. By convention these inter-face headers begin with the letter "i" and the interface name begins with "I". Such an interface is abstract because, in general, many modules in a system implement the same abstract interface; i.e., the interface de-fines abstract operations supported by many modules. |
| Algorithm: | Technically, an algorithm is a sequence of operations, each chosen from a finite set of well-defined operations (for example, computer instructions), that halts in a finite time, and computes a mathematical function. In this specification, however, we allow algorithms to employ heuristics and do not require that they always produce a correct answer |
| API | Acronym for application programming interface. A specific set of constants, types, variables, and functions used to programmatically interact with a piece of software. |
| Client: | The term client denotes any piece of software that uses a function, module, or interface. For example, if the function a() calls the function b(), a() is a client of b(). Similarly, if an application App uses module MOD, App is a client of MOD. |
| Concrete Interface | An interface defined by a C header whose functions are implemented by a single module within a system. This is in contrast to an abstract interface where multiple modules in a system can implement the same abstract interface. The header for every module defines a concrete interface. |
| Critical Section: | A critical section of code is one in which data that can be accessed by other threads are inconsistent. At a higher level, a critical section is a section of code in which a guarantee you make to other threads about the state of some data may not be true. If other threads can access these data during a critical section, your pro-gram may not behave correctly. This may cause it to crash, lock up, or produce incorrect results. In order to insure proper system operation, other threads are denied access to inconsistent data during a critical section (usually through the use of locks). Poor system performance could be the result if some of your critical sections are too long. |
| Endian: | Refers to which bytes are most significant in multi-byte data types. In big-endian architectures, the leftmost bytes (those with a lower ad-dress) are most significant. In little-endian architectures, the rightmost bytes are most significant. HP, IBM, Motorola 68000, and SPARC systems store multi-byte values in big-endian order, while Intel 80 x 86, DEC VAX, and DEC Alpha systems store them in little-endian order. Internet standard byte ordering is also big-endian. The TMS320C6000 is bi-endian because it supports both systems. |
| Frame: | Algorithms often process multiple samples of data at a time, referred to as a frame. In addition to improving performance, some algorithms require specific minimum frame sizes to operate properly. |
| Framework: | Part of an application that is designed to remain invariant while selected software components are added, removed, or modified. Very general frameworks are sometimes described as application-specific operating systems |
| Instance: | The specific data allocated in an application that defines a particular object. |
| Interface: | A set of related functions, types, constants, and variables. An interface is often specified with a C header file. |

TABLE 1-continued

Term Definitions

| | |
|---|---|
| Interrupt Latency: | The maximum time between when an interrupt occurs and its corresponding interrupt service routine (ISR) starts executing. |
| Method: | A synonym for a function that is part of an interface. |
| Module: | A module is an implementation of one (or more) interfaces. In addition, all modules follow certain design elements that are common to all XDAIS compatible software components. Roughly speaking, a module is a C language implementation of a C++ class |
| Multithreading: | Multithreading is the management of logically concurrent threads within the same program or system. Most operating systems and modem computer languages also support multithreading. |
| Preemptive: | A property of a scheduler that allows one task to asynchronously interrupt the execution of the currently executing task and switch to another task. The interrupted task is not required to call any scheduler functions to enable the switch. |
| Reentrant | A property of a program or a part of a program in its executable version, that can be entered repeatedly, or can be entered before previous executions have been completed. Each execution of such a pro-gram is independent of all other executions. |
| Scratch Memory | Memory that can be overwritten without loss; i.e., prior contents need not be saved and restored after each use. Scratch Register: A register that can be overwritten without loss; i.e, prior contents need not be saved and restored after each use. |
| Thread | The program state managed by the operating system that defines a logically independent sequence of program instructions. This state may be as small as the program counter (PC) value but often includes a large portion of the CPUs register set. |

Figure 2:
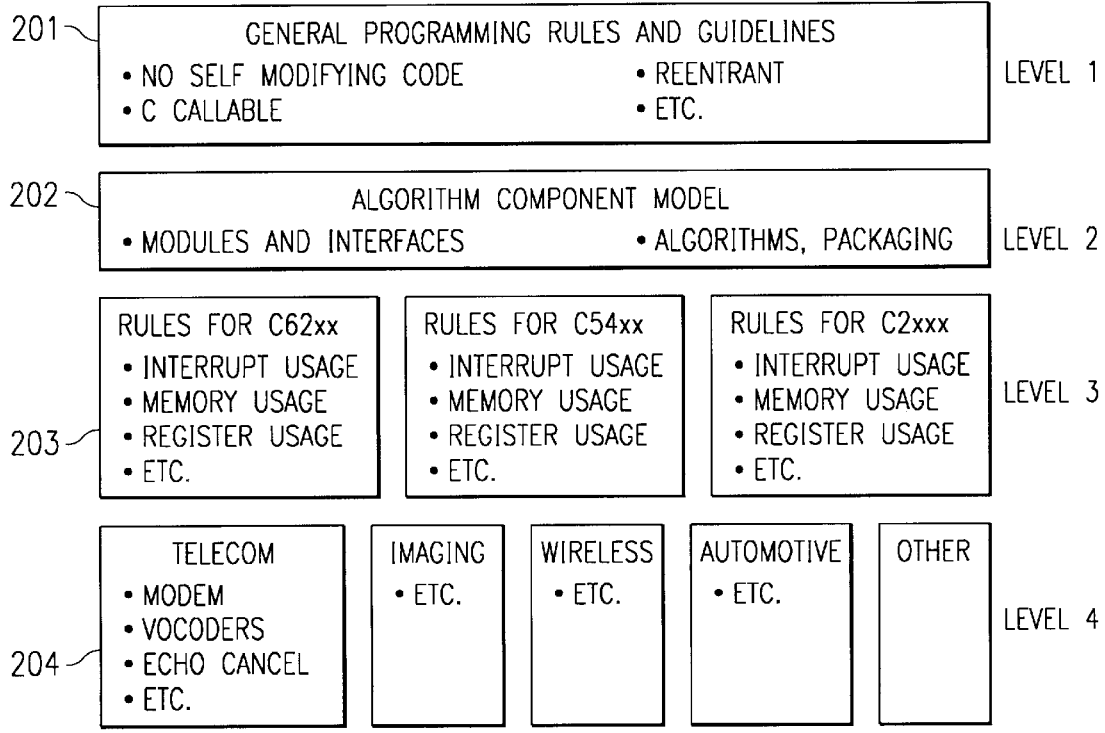
FIG. 2 is a hierarchical model illustrating elements to be considered in creating a component model for embedded systems.

FIG. 2 demonstrates the elements that should be considered in creating a component model for embedded systems. Level 1 201 contains programming guidelines that apply to all algorithms on all DSP architectures regardless of application area. Almost all recently developed algorithms follow these common sense guidelines but they are formalized in an embodiment of the present invention, as they must be followed for the embodiment to work successfully.

Level 2 202 describes software techniques to enable all algorithms to operate harmoniously within a single system. The present invention is most concerned with this level, presenting solutions to technical problems that previously made the creation of algorithms usable across multiple frameworks impossible.

Level 3 203 deals with guidelines for specific families of DSPs. Level 4 204 is concerned with various vertical markets. These levels are outside the scope of the present invention as they do not need to be addressed in order to implement the present invention.

For algorithms to satisfy the minimum requirements of reentrancy, I/O peripheral independence, and debuggability, they must rely on a core set of services that is always present. Since most algorithms are still produced using assembly language, many of the services provided by this core must be accessible and appropriate for assembly language.

In an embodiment of the present invention, the core set of services includes a subset of a DSP operating system together with some additions to support atomic modification of control/status registers. It also includes a subset of standard C language run-time support libraries; e.g., memcpy, strcpy, etc.

The DSP operating system is a collection of twelve modules:
CLK—On-Chip Timer Manager
GBL—Global Settings Manager
HST—Host I/O Manager
HWI—Hardware Interrupt Manager
IDL—Idle Function Manager
LOG—History Log Manager
MEM—Memory Manager
PIP—Data Pipe Manager
PRD—Periodic Function Manager
RTC—Real-Time Trace Manager
SWI—Software Interrupt Manager
STS—Statistics Accumulator Manager Of these modules, only SWI, PRD, and IDL are directly related to thread scheduling. Table 2 describes which operations are callable. Unless otherwise noted, any operation that does not appear in this table must not be called.

TABLE 2

Callable Operations

| Allowed or Disallowed | Module | Typical Functions in Category | Notes |
|---|---|---|---|
| allowed | CLK | CLK_gethtime, CLK_getltime | 1 |
| allowed | HST | HST_getpipe | 1 |
| allowed | HWI | HWI_disable, HWI_enable, HWI_restore | 2 |
| disallowed | HWI | HWI_enter, HWI_exit | |
| allowed | LOG | LOG_event, LOG_printf, LOG_error, etc. | 1 |
| allowed | PIP | PIP_alloc. PIP_get, PIP_put, PIP_free | 1 |
| allowed | PRD | PRD_getticks | |
| disallowed | PRD | PRD_start, PRD_tick | |
| allowed | RTC | RTC_disable, RTC_enable, RTC_query | 3 |
| allowed | STS | STS_add, STS_delta, STS_set, etc. | 1 |

Notes:
All operations provided by this module are callable by algorithms
These operations are the only way to create critical sections within an algorithm and provide a processor independent way of controlling preemption.
RTC_enable and RTC_disable take a mask that should be configurable; i.e., hard constants should not be used.

It is important to realize that none of the LOG, RTC, or STS operations has any semantic effect on the execution of an algorithm. In other words, it is possible to implement all of these operations as aliases to a function that simply returns and the operation of the algorithm will be unaffected.

Table 3 summarizes the C language run-time support library functions that may be referenced in an embodiment of the present invention.

TABLE 3

Run-Time Support Library Functions

| Allowed or Disallowed | Category | Typical functions in category | Notes |
| --- | --- | --- | --- |
| allowed | String functions | strcpy, strchr, etc. | 1 |
| allowed | Memory-moving functions | memcpy, memmove, memset, etc. | 2 |
| allowed | Integer math support | _divi, _divu, _remi, _remu, etc. | 2 |
| allowed | Floating point support | _addf, _subf, _mpyf, _divf, _addd, _subd, _mpyd, _divd, log10, cosh, etc. | 2, 3 |
| allowed | Conversion functions | atoi, ftoi, itof, etc. | 2 |
| disallowed | Heap management functions | malloc, free, realloc, alloc, etc. | 5 |
| disallowed | I/O functions | printf, open, read, write, etc. | 4 |
| disallowed | Misc. non-reentrant functions | printf, sprintf, ctime, etc. | 5, 6 |

Notes:
Exceptions: strtok is not reentrant, and strdup allocates memory with malloc.
The compiler issues some of these automatically for certain C operators.
The errno paradigm isn't reentrant. Thus, errno must not be used.
Algorithms are not allowed to perform I/O (except via DSP/BIOS APIs).
Algorithms must not allocate memory.
Algorithms must be reentrant and must, therefore, only reference reentrant functions.

All algorithms must follow certain programming rules:
1. All algorithms must follow the run-time conventions imposed by an implementation of the C programming language.
2. All algorithms must be reentrant within a preemptive environment (including time-sliced preemption).
3. All algorithm data references must be fully relocatable (subject to alignment requirements). That is, there must be no "hard coded" data memory locations.
4. All algorithm code must be fully relocatable. That is, there can be no "hard coded" program memory locations.
5. Algorithms must characterize their ROM-ability; i.e., state whether they may be placed in ROM or not.
6. Algorithms must never directly access any peripheral device. This includes but is not limited to on-chip DMAs, timers, I/O devices, and cache control registers.

The most basic software component is the module. In this embodiment, all algorithms are implemented as modules. A module is an implementation of one (or more) interfaces. An interface is simply a collection of related type definitions, functions, constants, and variables. In the C language, a header file typically specifies an interface. It is important to note that not all modules implement algorithms, but all algorithm implementations must be modules.

Figure 3:
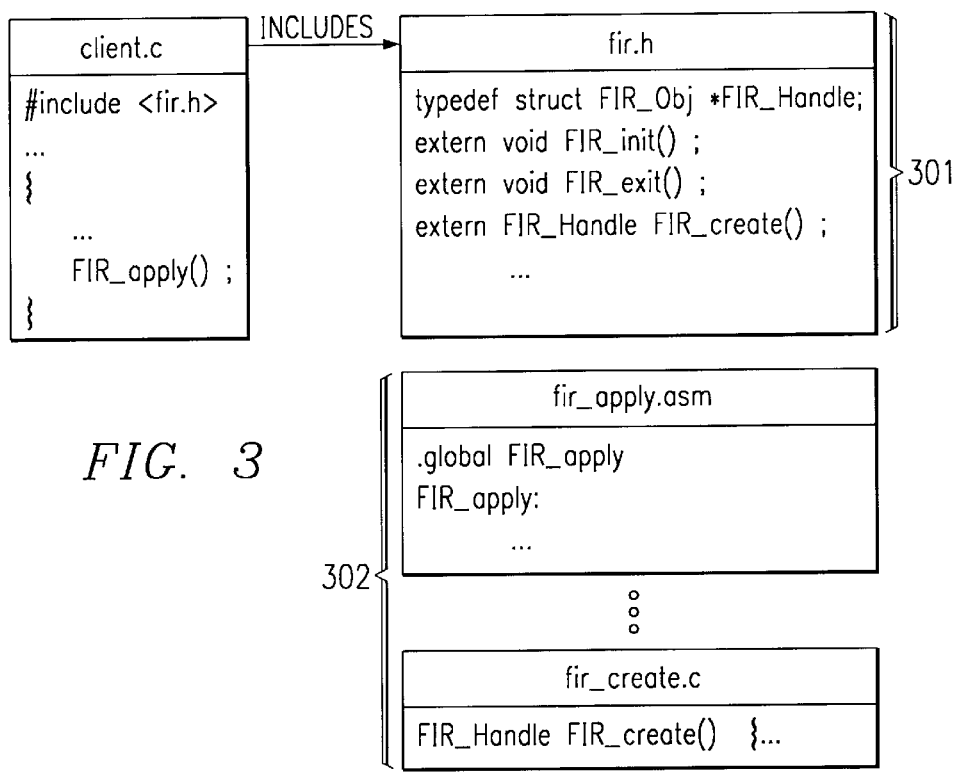
FIG. 3 is a block diagram of a component model for embedded systems with a module interface that embodies the present invention.

All modules must follow the following conventions:
Provide a single header that defines the entire interface to the module
Implement a module initialization and finalization method
Optionally manage one or more "instance" objects of a single type
Optionally declare a "Config" structure defining module-wide configuration options For example, consider FIG. 3. Suppose a module called FIR, which consists of functions that create and apply finite impulse response filters to a data stream, is created. Interface 301 to this module is declared in the single C header file fir.h. Any application that wants to use the functions provided by implementation 302 in the FIR module must include the header fir.h. Although Interface 301 is declared as a C header file, the module may be implemented entirely in assembly language (or a mix of both C and assembly). Since interfaces may build atop other interfaces, all header files are required to allow for the possibility that they might be included more than once by a framework.

The general technique for insuring this behavior for C header files is illustrated in the code in Table 4.

TABLE 4

Sample Header File Code for Multiple Inclusion

```
/*
 * ======== fir.h ========
 */
#ifndef FIR_
#define FIR_
...
#endif /* FIR */
```

A similar technique should be employed for assembly language headers, as illustrated in Table 5.

TABLE 5

Assembly Language Header

```
;
; ======== fir.h54 ========
;
.if ($isdefed("FIR_") = 0)
FIR_ .set 1
...
.endif
```

Since multiple algorithms and system control code are often integrated into a single executable, the only external identifiers defined by an algorithm implementation (i.e., symbols in the object code) should be those specified by the algorithm application program interface (API) definition. Unfortunately, due to limitations of traditional linkers, an identifier must sometimes have external scope even though it is not part of the algorithm API. Thus, to avoid namespace collisions, vendor selected names must not conflict. All external identifiers defined by a module's implementation must be prefixed by "<module>_<vendor>_<name>", where <module> is the name of the module (containing only alphanumeric characters), <vendor> is the name of the vendor (containing only alphanumeric characters), and <name> is the unique name of the identifier (containing only alphanumeric characters). For example, for a vendor "TI", TI's implementation of the FIR module must only contain external identifiers of the form FIR__TI__<name>. If there are external identifiers that are common to all implementations, the <vendor> component may be eliminated. For example, if the FIR module interface defined a constant structure that is used by all implementations, its name would have the form FIR__<name>.

In addition to the symbols defined by a module, the symbols referenced by all modules must be defined. All undefined references must refer either to the C run-time support library functions or to operations in the DSP operating system modules or to other modules that comply with the rules of this embodiment.

All modules must follow the naming conventions summarized in Table 6. Note that the naming conventions only apply to external identifiers. Internal names and existing code need not change unless an identifier is externally visible to a framework.

TABLE 6

Naming Conventions

| Convention | Description | Example |
| --- | --- | --- |
| Variables and functions | Variables and functions begin with lower case (after the prefix) | LOG__printf() |
| Constants | Constants are all uppercase | G729__FRAMELEN |
| Types | Data types are in title case (after the prefix) | LOG__Obj |
| Structure fields | Structure fields begin with lowercase | Buffer |
| Macros | Macros follow the conventions of constants or functions as appropriate | LOG__getbuf() |

In addition to these conventions, multi-word identifiers should never use the '__' character to separate the words. To improve readability, use title case; for example, LOG__getBuffer ( ) should be used in lieu of LOG__get__buffer ( ). This avoids ambiguity when parsing module and vendor prefixes.

Before a module can be used by an application, it must first be "initialized"; i.e., the module's init ( ) method must be run. Similarly, when an application terminates, any module that was initialized must be "finalized"; i.e., its exit ( ) method must be executed. Initialization methods are often used to initialize global data used by the module that, due to the limitations of the C language, cannot be statically initialized. Finalization methods are often used to perform run-time debug assertions. For example, a finalization method might check for objects that were created but never deleted. The finalization method of a non-debug version of a module is often the empty function.

Although some modules have no need for initialization or finalization, it is easier for frameworks to assume that all modules have them. Thus, frameworks can easily implement well-defined startup and shutdown sequences, for example.

Modules optionally manage instance objects. In this embodiment of the present invention, all algorithm modules manage instance objects. Objects simply encapsulate the persistent state that is manipulated by the other functions (or methods) provided by the module.

A module manages only one type of object. Thus, a module that manages objects roughly corresponds to a C++ class that follows a standard naming convention for its configuration parameters, interface header, and all external identifiers.

Figure 4:
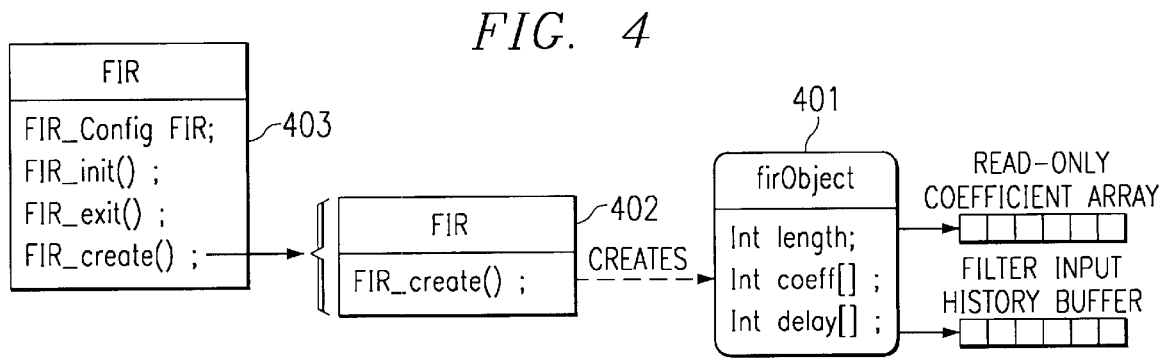
FIG. 4 is a block diagram illustrating the concept of managing an object using a module interface according to FIG. 3.

FIG. 4 illustrates this concept. Object 401 is created by function 402 of module 403. Module 403 implements a finite impulse response filter.

Many embedded systems are very static in nature. Memory, MIPS (millions of instructions per second), and I/O peripherals are statically partitioned among a fixed set of functions that operate continuously until power is removed. Static systems permit a number of performance optimizations that simply are not possible in dynamic systems. For example, a memory manager is not required in a static system and general data structures, such as linked lists, can often be replaced with much simpler and more efficient structures, such as fixed length arrays. These optimizations obviously reduce the system's code size requirements and, they may have a significant effect on the execution performance of the system.

When designing a system that is very cost sensitive, must operate with limited power, and/or has limited MIPS, designers look for portions of the system that can be fixed at design time (i.e., made static). Even if the entire system cannot be static, often certain sub-systems can be fixed at design time. It is important, therefore, that all modules efficiently support static system designs. In practice, this simply means that all functions that are only required for run-time object creation be placed either in separate compilation units or separate COFF (Common Object File Format) output sections that can be manipulated by the linker. Ideally, every function should be in a separate compilation unit so the system integrator can eliminate run-time support that is unnecessary for a static system. An example that illustrates this "design-time" object creation for static systems is presented later in this specification.

Modules may optionally support run-time object creation and deletion. In some applications, run-time creation and deletion is a requirement. Without the ability to remove unneeded objects and reuse memory, the physical constraints of the system make it impossible to create rich multi-functions applications.

Run-time creation of objects is valuable even in systems that do not support or require run-time deletion of these objects. The precise nature of the objects, the number of objects, and even the type of objects created may be a function of parameters that are only available at run-time. For example, a programmer may want to create a single program that works in a variety of hardware platforms that differ in the amount of memory available and the mount is determinable at run-time. Note that the algorithms conforming to an embodiment of the present invention are modules of a special type, which are referred to as algorithm modules herein. How the algorithm modules support run-time object creation is another embodiment of the present invention described later in this specification.

In an ideal world, a module that implements an API can be used in any system that requires the API. As a practical matter, however, every module implementation must make trade-offs among a variety of performance metrics such as program size, data size, MIPS, and a variety of application specific metrics such as recognition accuracy, perceived audio quality, and throughput. Thus, a single implementation of an API is unlikely to make the right set of tradeoffs for all applications.

Therefore, any framework that wishes to incorporate modules following the specification herein must support multiple implementations of the same API. In addition, each module has one or more "global configuration" parameters that can be set at design time by the system integrator to adjust the behavior of the module to be optimal for its execution environment.

Suppose, for example, that a module that implements digital filters exists. There are several special cases for digital filters that have significant performance differences such ass all-pole, all-zero, and pole-zero filters. Moreover, for certain DSP architectures if one assumes that the filter's data buffers are aligned on certain boundaries, the implementation can take advantage of special data addressing modes and significantly reduce the time required to complete the computation. A filter module may include a global configuration parameter that specifies that the system will only use all-zero filters with aligned data. By making this a design-time global configuration parameter, systems that are willing to accept constraints in their use of the API are rewarded by faster operation of the module that implements the API.

Modules that have one or more "global" configuration parameters should group them together in a C structure, called XYZ_Config, and declare this structure in the module's header. In addition, the module should declare a static constant structure named XYZ of type XYZ_Config that contain the module's current configuration parameters.

FIG. 5 contains the code for a very simple module to illustrate the concept of modules and how they might be implemented in the C language. This module implements a simple FIR filter.

As discussed above, the first two operations that must be supported by all modules are the init ( ) and exit ( ) functions. The init ( ) function is called during system startup while the exit ( ) function is called during system shutdown. These entry points, shown in code block 501, exist to allow the module to perform any run-time initialization necessary for the module as a whole. More often than not, these functions have nothing to do and are simply empty functions.

The create entry point, shown in code block 502, creates and initializes an object; i.e., a C structure. The object encapsulates all the state necessary for the other functions to do their work. All of the other module entry points (functions) are passed a pointer to this object as their first argument. If the functions only reference data that is part of the object (or referenced within the object), the functions will naturally be reentrant. In this example, code block 502 would create and initialize the structure defined in code block 505 using the parameter defined in the same code block.

The delete entry point, shown in code block 503, should release any resource held by the object being deleted and should gracefully handle the deletion of partially constructed objects. The delete entry point may be called by the create operation. In this example, the delete operation has nothing to do.

Finally, the FIR module must provide a method for filtering a signal. This is accomplished via the apply operation shown in code block 504. In a real FIR module, the filter operation would be implemented in assembly language. However, because the state necessary to compute the algorithm is entirely contained in the object, this algorithm is reentrant. Thus, it is easy to use this module in multi-channel applications or in single channel applications that require more than one FIR filter.

Modern component programming models support the ability of a single component to implement more than one interface. This allows a single component to be used concurrently by a variety of different applications. For example, in addition to a component's concrete interface (defined by its header), a component might also support a debug interface that allows debuggers to inquire about the existence and extent of the component's debug capabilities. If all debuggable components implement a common abstract debug interface, debuggers can be written that can uniformly debug arbitrary components.

Support for multiple interfaces is generally incorporated into the development environment, the programming language itself, or both. Since this embodiment is intended to only require the C language, the ability of a module to support multiple interfaces is, at best, awkward.

However, several significant benefits make this approach worthwhile:

A vendor may opt to not implement certain interfaces for some components

New interfaces can be defined without affecting existing components

Multiple implementations of the same interface may be present in a single system Partitioning a large interface into multiple simpler interfaces makes it easier to understand the component as a whole.

Figure 6:
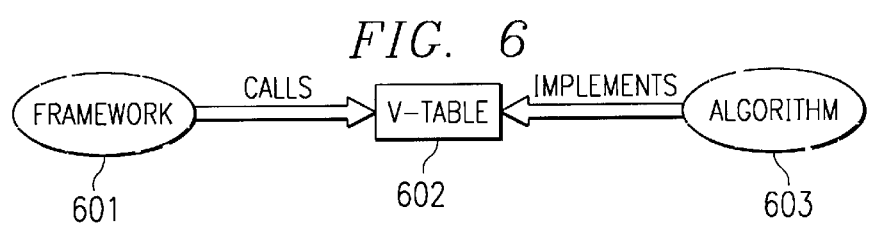
FIG. 6 is a flow chart illustrating how a framework in a component model of FIG. 3 calls functions in a module.

As stated previously, header files define interfaces, and each header file defines a single interface. A module's header file defines a concrete interface. The functions defined in the header uniquely identify a specific (or concrete) implementation within a system. A special type of interface header is used to define abstract interfaces. Abstract interfaces define functions that are implemented by more than one module in a system. An abstract interface header is identical to a normal module interface header except that it declares a structure of function pointers named XYZ_fxns. A module ABC is said to implement an abstract interface XYZ if it declares and initializes a static structure of type XYZ_Fxns named ABC_XYZ. By convention, all abstract interface headers begin with the letter 'i'. This static structure, referred to subsequently as the v-table, is the mechanism through which a framework can manage an instance of the algorithm. As illustrated in FIG. 6, v-table 602 is a table of pointers to the functions implemented by algorithm 603 that framework 601 must use to execute the functions of algorithm 603.

In this embodiment of the present invention, all algorithm modules must implement an abstract interface that is described later in this specification. This abstract interface is called IALG.

Although all algorithm modules are required to implement the IALG interface, it is important to note that almost all of them must implement a more specific interface as well. They must implement functions specific to the algorithm. For example, a G.729 encoder algorithm module must not only implement IALG; it must also implement an "encode" function that is specific to the algorithm.

In this common case, a new interface is defined that "derives from" or "inherits from" the IALG interface. Interface inheritance is implemented by simply defining the new interface's v-table or "Fxns" structure so that its first field is the v-table or "Fxns" structure from which the interface is inherited. Thus, any pointer to the new interface's "Fxns" structure can be treated as a pointer to the inherited interface's "Fxns" structure. In the case of the G.729 encoder implementation, this simply means that the first field of the G729E_Fxns structure is an IALG_Fxns structure.

The previous paragraphs have described the structure shared by all modules. Table 7 summarizes the common design elements for a module named XYZ.

TABLE 7

Common Module Design Elements

| Element | Description | Required? |
|---|---|---|
| XYZ_init () | Module initialization and | yes |
| XYZ_exit () | finalization functions | |

TABLE 7-continued

Common Module Design Elements

| Element | Description | Required? |
| --- | --- | --- |
| xyz.h | Module's interface definition | Yes |
| XYZ_config | Structure type of all module configuration parameters | Only if module has global configuration parameters |
| XYZ | Constant structure of all module configuration parameters | Only if module has global configuration parameters |
| XYZ_Fxns | Structure type defining all functions necessary to implement the XYZ interface | Only if the interface is abstract interface detinition |

Table 8 summarizes the common elements of all modules that manage one or more instance objects.

TABLE 8

Common Elements of Modules Managing Instance Objects

| Element | Description | Required? |
| --- | --- | --- |
| Struct XYZ_Obj | Module's object definition; normally not defined in the module's header | yes |
| XYZ_Handle | Handle to an instance object; synonym for struct XZY_Obj | yes |
| XYZ_Params | Structure type for all module object creation parameters | yes |
| XYZ_PARAMS | Constant structure for all default object creation parameters | yes |
| XYZ_create () | Run-time creation and initialization of an module's object | no |
| XYZ_delete () | Run-time deletion of a module's object | no |

In this embodiment of the present invention, algorithm modules are modules that implement the abstract interface IALG. IALG defines a framework independent interface for the creation of algorithm instance objects. The algorithm module must declare and initialize a structure of type IALG_Fxns, the structure must have global scope, and its name must be XYZ_IALG where XYZ is the unique module-vendor prefix as defined previously. The IALG interface allows algorithm modules to define their memory resource requirements (also called memory usage requirements) and thereby enable the efficient use of memory by frameworks.

The IALG interface defines a "protocol" between the framework and the algorithm module that is used to create an algorithm instance object. This interface is designed to enable the algorithm module to be used by frameworks implementing virtually any execution environment, i.e., preemptive and non-preemptive, static and dynamic systems. Thus, it is important that algorithm modules never use any memory allocation routines (including those provided in the standard C run-time support libraries). The framework must perform all memory allocation in accordance with the inverted memory protocol. Since algorithm module implementations are modules that support object creation, and, all such modules should support design-time object creation, all algorithm modules support both run-time and design-time creation of algorithm objects. To ensure support for design-time object creation, all functions defined by the IALG interface must be independently relocatable. In practice, this means that each function should either be implemented in a separate file or placed in a separate COFF output section. By placing each of these functions in a separate file or output section, a linker can be used to eliminate those methods that are unnecessary for frameworks that do not require run-time object creation.

In some cases, it is awkward to place each function in a separate file. Doing so may require making some identifiers globally visible or require significant changes to an existing code base. The C compiler supports a pragma directive that allows specified functions to be placed in distinct COFF sections. This pragma directive may be used in lieu of placing functions in separate files.

Since the IALG interface does not define functions that can be used to actually run an algorithm, each abstract algorithm interface must extend or "derive" from the IALG interface. Thus, every algorithm module has considerable flexibility to define the methods that are appropriate for the algorithm.

FIG. 7, which is divided into three parts 7A, 7B, and 7C, contains an example of the IALG algorithm instance interface. In an algorithm module implementation, it would be incorporated as a header file by means of the statement #include <ialg.h>.

A module implements the IALG interface if it defines and initializes a global structure of type IALG_Fxns as shown in code block 701. For the most part, this means that every function defined in this structure must be implemented and assigned to the appropriate field in this structure. Note that the first field, code line 702, of the IALG_Fxns structure is a Void * pointer. This field must be initialized to a value that uniquely identifies the module implementation. This same value must be used in all interfaces implemented by the module. Since all algorithms must implement the IALG interface, it is sufficient for algorithm modules to set this field to the address of the module's declared IALG_Fxns structure.

In some cases, an implementation of IALG does not require any processing for a particular method. Rather than require the module to implement functions that simply return to the caller, the function pointer may be set to NULL. This allows the framework to avoid unnecessarily calling functions that do nothing and avoids the code space overhead of these functions.

The functions defined in IALG_Fxns fall into several categories.
1. Instance object creation, initialization, and deletion
2. Algorithmic processing
3. Instance object control and relocation Removing memory allocation from the algorithm module complicates instance object creation. If an algorithm module is to be reusable in a variety of applications, the framework rather than the algorithm module must make decisions about memory overlays and preemption in accordance with the inverted memory protocol. Thus, it is important to give the framework as much control over memory management as possible. The functions algAlloc( ), algInit( ), and algFree( ) allow the algorithm module to communicate its memory usage requirements to the framework, let the algorithm module initialize the physical memory allocated by the framework, and allow the algorithm module to communicate the memory to be freed when an instance is no longer required, respectively. Note that these operations are not called in time critical sections of an application.

Once an algorithm instance object is created, it can be used to process data in real-time. The sub-classes of IALG define other entry points to algorithmic processing supported by algorithm modules. Prior to invoking any of these functions, frameworks are required to activate the instance object via the algActivate( ) function. The algActivate( ) function provides a notification to the algorithm instance that one or more algorithm processing functions is about to be run zero or more times in succession. After the processing methods have been run, the framework calls the algDeactivate ( ) function prior to reusing any of the instance's scratch memory. The algActivate( ) and algDeactivate( ) functions give the algorithm instance a chance to initialize and save scratch memory that is outside the main algorithm-processing loop defined by its extensions of the IALG interface.

The final two functions defined by the IALG interface are algControlO and algMovedo. The algControl( ) operation provides a standard way to control an algorithm instance and receive status in-formation from the algorithm instance in real-time. The algMoved( ) operation allows the framework to move an algorithm instance to physically different memory. Since the algorithm instance object may contain references to the internal buffer that may be moved by the framework, the framework is required to call the algMoved( ) function whenever the framework moves an object instance.

FIG. 8 summarizes the only valid sequences of execution of the IALG_Fxns functions for a particular algorithm instance. For simplicity, the algControl( ) and algNumAlloc( ) operations are not shown. The algControl( ) function may be called at any time after algInito and any time before algFree( ). The algNumAlloc( ) function may be called at any time.

As FIG. 8 illustrates, when a framework wants to execute an algorithm, it must first put the algorithm into a "start state". This is accomplished by executing step 801 followed by step 802. In step 801, algAlloc( ) is called to query the algorithm module about its memory requirements. In step 802, algInito is called to initialize the memory requested via the call to algAlloc( ) in step 801. The algorithm instance is now ready to execute.

Execution of the algorithm instance is comprised of the four steps 803, 804, 805, and 806. In step 803, the framework calls algActivate( ) to notify the algorithm instance that its memory is "active" and the algorithm instance processing functions in step 804 may be called. The framework may then optionally (the option to skip or execute this step is denoted by arrows 808) execute step 804, calling algMoved( ) to allow the algorithm instance to update any internal references. This is only necessary when the framework has relocated the algorithm's instance object during system execution. Then, the framework may call any of the processing functions in the algorithm instance as denoted by step 805. The framework may execute step 805 repeatedly as necessary to accomplish the purpose of the algorithm. If the framework relocates the algorithm's instance object between executions of step 805, it must repeat step 804 before continuing. Once the framework has finished using the processing functions of step 805, it may proceed to step 806. In step 806, the algDeactivate( ) function is executed to notify the current algorithm instance that it is about to be deactivated.

Once step 806 is completed, two options are available to the framework. It can choose to leave the algorithm instance in its "start state" pending reactivation or it can execute step 807. If the framework chooses to leave the algorithm instance in its "start state", it may reactivate the algorithm instance by executing the sequence described above starting with step 803. A framework will only execute step 807 if it wishes to reuse the memory that it has allocated to an algorithm instance.

In step 807, the function algFree( ) is called to ask the algorithm instance to identify any memory assigned to it. The framework uses this information to free up that memory for use by other algorithm instances. Once step 807 is executed, the algorithm instance is no longer in its "start state". If the framework wishes to use the algorithm instance again, it must restart the process with step 802.

Two other execution paths are available to the framework, as illustrated by arrows 809 and 810. Arrow 809 shows that once step 803 has been completed, the framework may choose to immediately go to step 806. Also, as per arrow 810, once step 802 is complete, the framework may choose to execute step 807.

Note that there is no requirement that any of the steps shown in FIG. 8 must be performed in a single uninterrupted execution cycle by the framework. The order of execution shown must be followed but there is no requirement on how much time may elapse or what other things the framework might choose to do between performing the steps for a given algorithm instance.

When algorithm instances are created, the framework can pass algorithm-specific parameters to the algAlloc( ) and the algInit( ) methods. To support implementation-specific extensions to standard abstract algorithm interfaces, every algorithm module's parameter structure must begin with the size field defined in the IALG_Params structure shown in FIG. 7B, code block 703. The framework sets this field to the size of the parameter structure (including the size field itself) that is being passed to the algorithm implementation. Thus, the implementation can "know" if the framework is passing just the standard parameter set or an extended parameter set. Conversely, the framework can elect to send just the "standard" parameters or an implementation-specific set of parameters. Of course, if a framework uses an implementation-specific set, the framework cannot be used with a different implementation of the same algorithm.

The code fragments shown in FIG. 9 illustrate how a framework may use the same style of parameter passing whether passing generic parameters or implementation-specific parameters. The implementation can also easily deal with either set of parameters. The only requirement is that the generic parameters always form a prefix of the implementation-specific parameters; i.e., any implementation-specific parameter structure must always include the standard parameters as its first fields.

This same technique is used to extend the algorithm module's status structures. In this case, however, all algorithm status structures start with the IALG_Status fields (see FIG. 7B, code block 704).

Modules that implement the IALG interface enable runtime instance creation using the generic create and delete functions shown in FIG. 10, code block 1001 and code block 1002 respectively.

To implement the IALG interface, all algorithm objects must be defined with IALG_Obj (see FIG. 7B, code block 705) as their first field. This insures that all pointers to algorithm objects can be treated as pointers to IALG_Obj structures.

The framework functions outlined above are just examples of how to use the IALG functions to create simple object create and delete functions. Other frameworks might create objects very differently. For example, one can imagine a framework that creates multiple objects at the same time by first invoking the algAlloc( ) function for all objects, optimally allocating memory for the entire collection of objects, and then completing the initialization of the objects. By considering the memory requirements of all objects prior to allocation, such a framework can more optimally assign memory to the required algorithms.

Once an algorithm instance is created, it can be used to process data. However, if the algorithm module defines the algActivate( ) and algDeactivate( ) functions, they must bracket the execution of any of the algorithm modules processing functions. The function shown in FIG. 11 could be used, for example, to execute any implementation of the IFIR interface on a set of buffers. This implementation of FIR_apply( ) assumes that all persistent memory is not shared; thus, it does not restore this data prior to calling algActivate( ) and it does not save this memory after algDeactivate( ). If a framework shares persistent data among algorithm instances, it must insure that this data is properly restored prior to running any processing methods of the algorithm instances.

If an algorithm instance's processing functions are always executed as shown in the FIR_apply( ) function in FIG. 11, there is no need for the algActivate( ) and algDeactivate( ) functions. To save the overhead of making two function calls, their functionality would be folded into the processing functions. The purpose of algActivate( ) and algDeactivate( ) is to enable the algorithm's processing functions to be called multiple times between calls to algActivate( ) and algDeactivate( ). This allows the algorithm writer the option of factoring data initialization functions, such as initialization of scratch memory, into the algActivate( ) function. The overhead of this data movement can then be amortized across multiple calls to processing functions.

Each of the functions described above is presented in more detail below to further clarify an embodiment of the present invention. The functions are presented in alphabetic order. The descriptions include an example implementation along with detailed descriptions. Note that each of the example implementations assumes the presence of the IALG algorithm interface shown in FIG. 7.

The function algActivate( ), an implementation of which is shown in FIG. 12 code segment 1201, initializes any of the instance's scratch buffers using the persistent memory that is part of the algorithm's instance object. The first (and only) argument to algActivate( ) is an algorithm instance handle. This handle is used by the algorithm to identify the various buffers that must be initialized prior to calling any of the algorithm's processing functions.

The implementation of algActivate( ) is optional. The algActivate( ) method should only be implemented if a module wants to factor out initialization code that can be executed once prior to processing multiple consecutive frames of data. If a module does not implement this method, the algActivate field in the module's v-table must be set to NULL. This is equivalent to the implementation in Table 9.

TABLE 9

Non-Implementation of algActivate()

Void algActivate(IALG_Handle handle)
{
}

The following conditions must be true prior to calling this method; otherwise, its operation is undefined.
algActivate( ) can only be called after a successful return from algInit( ).
handle must be a valid handle for the algorithm's instance object.
No other algorithm method is currently being run on this instance. This method never preempts any other method on the same instance.

The function algAlloc( ), an example implementation of which is shown in FIG. 13, returns a table of memory records that describe the size, alignment, type and memory space of all buffers required by an algorithm instance (including the instance object itself). If successful, this function returns a positive non-zero value indicating the number of records initialized. This function can never initialize more memory records than the number returned by the function algNumAlloc( ). If algNumAlloc( ) is not implemented, the maximum number of initialized memory records is IALG_DEFMEMRECS (see code line 706 in FIG. 7A).

The first argument to algAlloc( ) is a pointer to the creation arguments for the instance of the algorithm object to be created. The creation arguments must be in a structure of type IALG_Params (see code block 703 in FIG. 7B). This pointer is algorithm-specific; i.e., it points to a structure that is defined by each particular algorithm. This pointer may be NULL, however. In this case, algAlloc( ), must assume default creation parameters and must not fail.

The second argument to algAlloc( ) is an optional output parameter. algAlloc( ) may return a pointer to another set of IALG functions to the framework. This set of IALG functions must be in a structure of type IALG_Fxns (see code block 701 in FIG. 7C). If this output value is set to a non-NULL value, the framework creates an instance object using this set of IALG functions. The resulting instance object must then be passed to algInit( ). algAlloc( ) may be called at any time and it must be idempotent; i.e., it can be called repeatedly without any side effects and always returns the same result.

The third argument to algAlloc( ) is an output parameter that is a structure of type IALG_MemRec (see code block 710 in FIG. 7A). This memory table contains the information about the size, type, alignment, etc. of the memory blocks required by the algorithm instance.

The following conditions must be true prior to calling this method; otherwise, its operation is undefined.
The number of memory records in the array memTab[ ] is no less than the number returned by algNumAlloc( ).
*parentFxns is a valid pointer to an IALG_Fxns pointer variable.
The params parameter may be NULL.

The following conditions are true immediately after returning from this method.
If the algorithm instance needs a parent object to be created, the pointer *parentFxns is set to a non-NULL value that points to a valid IALG_Fxns structure, the parent's IALG implementation. Otherwise, this pointer is not set. algAlloc( ) may elect to ignore the parentFxns pointer altogether.
Exactly n elements of the memTab[ ] array are initialized, where n is the return value from this operation. The base field of each element is not initialized, however.
If the params parameter is NULL, the algorithm instance assumes default values for all fields defined by the parameter structure.
memTab[0] defines the memory required for the instance's object and this object's first field is an IALG_Obj structure (see code block 705 in FIG. 7B).
If the operation succeeds, the return value of this operation is greater than or equal to one. Any other return value indicates that the parameters specified by params are invalid.

The function algControl( ), an implementation of which is shown in FIG. 14, sends an algorithm specific command, cmd, and an input/output status buffer pointer to an algorithm module's instance object.

The first argument to algControl( ) is an algorithm instance handle. algControl( ) must only be called after a successful call to algInit( ) but may be called prior to algActivate( ). algControl( ) must never be called after a call to algFree( ).

The second and third parameters are algorithm (and possible implementation) specific values. Algorithm and implementation-specific cmd values are always less than IALG_SYSCMD (see FIG. 7A code line 711). Upon successful completion of the control operation, algControl( ) returns IALG_EOK (see FIG. 7A code line 712); otherwise it returns IALG_EFAIL (see FIG. 7A code line 713) or an algorithm-specific error return value.

In preemptive execution environments, algControl( ) may preempt a module's other functions.

The implementation of algcontrol( ) is optional. If a module does not implement this method, the algControl field in the module's static function table (of type IALG_Fxns) must be set to NULL. This is equivalent to the implementation in Table 10.

TABLE 10

Non-Implementation of algControl()

Int algControl(IALG_Handle handle,
IALG_Cmd cmd, IALG_Status *status)
{
return (IALG_EFAIL);
}

The following conditions must be true prior to calling this method; otherwise, its operation is undefined.

algControl( ) can only be called after a successful return from algInit( ).

handle must be a valid handle for the algorithm's instance object.

Algorithm-specific cmd values are always less than IALG_SYSCMD.

The following conditions are true immediately after returning from this method.

If the control operation is successful, the return value from this operation, is equal IALG_EOK; otherwise it is either IALG_EFAIL or an algorithm specific return value.

If the cmd value is not recognized, the return value from this operation is not equal to IALG_EOK.

The function algDeactivate( ), an implementation of which is shown in FIG. 12 code block 1202, saves any persistent information to non-scratch buffers using the persistent memory that is part of the algorithm's instance object. The first (and only) argument to algDeactivate( ) is an algorithm instance handle. This handle is used by the algorithm instance to identify the various buffers that must be saved prior to the next cycle of algActivate( ) and processing.

The implementation of algDeactivate( ) is optional. The algDeactivate( ) function is only implemented if a module wants to factor out initialization code that can be executed once prior to processing multiple consecutive frames of data.

If a module does not implement this function, the algDeactivate field in the module's v-table must be set to NULL. This is equivalent to the implementation in Table 11.

TABLE 11

Non-Implementation of algDeactivate

Void algDeactivate(IALG_Handle handle)
{
}

The following conditions must be true prior to calling this function; otherwise, its operation is undefined.

algDeactivate( ) can only be called after a successful return from algInit( ).

The instance object is currently "active"; i.e., all instance memory is active and if an algActivate( ) function is defined, it has been called.

handle must be a valid handle for the algorithm's instance object.

No other algorithm function is currently being run on this instance. This function never preempts any other function on the same instance.

The following conditions are true immediately after returning from this method.

No processing functions in the algorithm instance may now be executed by framework; only algActivate( ) or algFree( ) may be called.

All instance scratch memory may be safely overwritten.

The function algFree( ), an example implementation of which is shown in FIG. 15, returns a table of memory records that describe the base address, size, alignment, type, and memory space of all buffers previously allocated for the algorithm instance (including the algorithm instance object) specified by handle. This function always returns a positive non-zero value indicating the number of records initialized. This function can never initialize more memory records than the value returned by algNumAlloc( ).

The following conditions must be true prior to calling this function; otherwise, its operation is undefined.

The memTab[ ] array contains at least algNumAlloc( ) records.

handle must be a valid handle for the algorithm instance object.

If the prior call to algAlloc( ) returned a non-NULL parent function pointer, then the parent instance must be an active instance object created via that function pointer.

No other algorithm function in this instance is currently being run. This function never preempts any other function of the same instance.

The following conditions are true immediately after returning from this function.

MemTab{ } contains pointers to all of the memory passed to the algorithm instance via algInit( ).

The size and alignment fields contain the same values passed to the framework via the algAlloc( ) function; i.e., if the framework makes changes to the values returned via algAlloc( ) and passes these new values to algInit( ), the algorithm is not responsible for retaining any such changes.

The function algInit( ), an example implementation of which is shown in FIG. 16, performs all initialization necessary to complete the run-time creation of an algorithm's instance object. After a successful return from algInit( ), the algorithm's instance object is ready to be used to process data. The first argument to algInit( ) is an algorithm instance handle. This handle is a pointer to an initialized IALG_Obj structure (see code block 707 in FIG. 7B). Its value is identical to the memTab[0].base.

The second argument is a table of memory records of type IALG_MemRec, that describes the base address, size, alignment, type, and memory space of all buffers allocated for an algorithm instance (including the algorithm's instance object). The number of initialized records is identical to the number returned by a prior call to algAlloc( ).

The third argument is a handle to another algorithm instance object. This parameter is often NULL indicating that no parent object exists. This parameter allows frameworks to create a shared algorithm instance object and pass it to other algorithm instances. For example, a parent instance object might contain global read-only tables that are used by several instances of a vocoder.

The last argument is a pointer to algorithm-specific parameters that are necessary for the creation and initialization of the instance object. This pointer points to the same parameters passed to the algAlloc( ) operation. However, this pointer may be NULL. In this case, algInit( ), must assume default creation parameters.

The framework is not required to satisfy the IALG_MemSpace (see code block 708 of FIG. 7A) attribute of the requested memory. Thus, the algorithm instance is required to properly operate (although much less efficiently) even if it is not given memory in, say on-chip DARAM.

The following conditions must be true prior to calling this function; otherwise, its operation is undefined.

memTab[ ] contains pointers to non-overlapping buffers with the size and alignment requested via a prior call to algAlloc( ). In addition, the algorithm parameters, params, passed to algAlloc( ) are identical to those passed to this operation.

The buffer pointed to in memTab[0] is initialized to contain all 0s.

handle must be a valid handle for the algorithm's instance object; i.e. handle==memTab[0].base and handle->fxns is initialized to point to the appropriate IALG_Fxns structure.

If the prior call to algAlloc( ) returned a non-NULL parent functions pointer, then the parent handle, parent, must be a valid handle to an instance object created via that function pointer.

No other algorithm function is currently being run on this instance. This function never preempts any other function on the same instance.

If parent is non-NULL, no other function is currently being run on the parent instance; i.e., this function never preempts any other function on the parent instance.

The following condition is true immediately after returning from this method: all of the instance's persistent memory is initialized and the object is ready to be used (with the exception of any initialization performed by algActivate( )).

The function algMoved( ), an example implementation of which is shown in code block 1701 in FIG. 17, performs any reinitialization necessary to insure that, if an algorithm's instance object has been moved by the framework, all internal data references are recomputed. The arguments to algMoved( ) are identical to the arguments passed to algInit( ). In fact, in many cases an algorithm module may use the same function defined for algInit( ) to implement algMoved( ). However, it is important to realize that algMoved( ) is called in real-time whereas algInit( ) is not. Much of the initialization required in algInit( ) does not need to occur in algMoved( ). The framework is responsible for copying the instance's state to the new location and only internal references need to be recomputed.

Although the algorithm's parameters are passed to algMoved( ), with the exception of pointer values, their values must be identical to the parameters passed to algInit( ). The data referenced by any pointers in the params structure must also be identical to the data passed to algInit( ). The locations of the values may change but their values must not. The implementation of algMoved( ) is optional. However, it is highly recommended that this method be implemented.

If a module does not implement this method, the algMoved( ) field in the module's v-table must be set to NULL. This is equivalent to asserting that the algorithm's instance objects cannot be moved.

The following conditions must be true prior to calling this method; otherwise, its operation is undefined.

memTab[ ] contains pointers to all of the memory requested via a prior call to algAlloc( ). The algorithm parameters, params, passed to algInit( ) are identical to those passed to this operation with the exception that pointer parameters may point to different locations, but their contents (what they point to) must be identical to what was passed to algInit( ).

All buffers pointed to by memTab[ ] contain exact copies of the data contained in the original instance object at the time the object was moved. handle must be a valid handle for the algorithm's instance object; i.e., handle==memTab[0].base and handle->fxns is initialized to point to the appropriate IALG_Fxns structure.

If the prior call to algInit( ) was passed a non-NULL parent handle, then the parent handle, parent, must also be a valid handle to an instance object created with the parent's IALG function pointer.

algMoved( ) is invoked only when the original instance object is active; i.e., after algActivate( ) and before algDeactivate( ).

No other algorithm function is currently being run on this instance. This function never preempts any other function on the same instance.

The following condition is true immediately after returning from this function. The instance object is functionally identical to the original instance object. It can be used immediately with any of the algorithm's functions.

The function algNumAlloc( ), an implementation of which is presented in FIG. 18 code block 1801, returns the maximum number of memory allocation requests that the algAlloc( ) function requires. This operation allows frameworks to allocate sufficient space to call the algAlloc( ) function or fail because insufficient space exists to support the creation of the algorithm's instance object. algNumAlloc( ) may be called at any time and it must be idempotent; i.e., it can be called repeatedly without any side effects and always returns the same result.

algNumAlloc( ) is optional; if it is not implemented, the maximum number of memory records for algAlloc( ) is assumed to be IALG_DEFMEMRECS (see FIG. 7A code line 706). This is equivalent to the implementation shown in Table 12.

TABLE 12

| Non-Implementation of algNumAlloc() |
| --- |
| Int algNumAlloc (Void)<br>{<br>return (IALG_DEFNUMRECS);<br>} |

If a module does not implement this method, the algNumAlloc field in the module's v-table must be set to NULL.

The following condition is true immediately after returning from this function. The return value from algNumAlloc( ) is always greater than or equal to one and always equals or exceeds the value returned by algAlloc( ).

Trace Control Interface

To improve both the system integration efforts as well as enhance in-field diagnostics, all algorithms should implement a uniform trace and diagnostic interface. In an embodiment of the present invention, this capability is implemented as an alternate module interface as defined in subsequent paragraphs.

The real-time trace control interface (IRTC) defines an interface that, when implemented, allows a module's various trace modes to be enabled, disabled, and controlled in real time. FIG. 19 shows an implementation of IRTC. It would be included in a module's definition with the following line of code: #include <irtc.h>.

A module implements the IRTC interface if it defines and initializes a global structure of type IRTC_Fxns (see FIG. 19 code block 1901). For the most part, this means that every function defined in this structure must be implemented and assigned to the appropriate field in this structure. It is important to note that the first field of the IRTC_Fxns structure is a Void* pointer. This field must be initialized to a value that uniquely identifies the module implementation. This same value must be used in all interfaces implemented by the module. Since all algorithms must implement the IALG interface, it is sufficient for algorithm modules to set this field to the address of the module's declared IALG_Fxns structure. The subsequent paragraphs describe the functions that must be implemented in each module that includes this interface.

The function rtcBind( ) sets the module's current output log. For any module that implements the IRTC interface, there is just one output log. All instances use a single output log. The first (and only) argument to rtcBind( ) is pointer to a LOG object.

The following conditions must be true prior to calling this function; otherwise, its operation is undefined.

log must be a valid pointer to an object managed by the LOG module.

No other module function is currently being run on any instance; i.e., this method never preempts any other function on any instance managed by the implementing module.

The following condition is true immediately after returning from this function. All subsequent output trace is redirected to the LOG object received as the argument.

The code segment in Table 13 is an example implementation of rtcBind.

TABLE 13

Example Implementation of rtcBind

```
FIR_TI_rtcLog = NULL;
Void rtcBind(LOG_Obj *log)
{
    /* set current output log */
    FIR_TI_rtcLog = log;
}
```

The function rtcGet( ) returns the current setting of the trace mask for a trace instance object. For any module that implements the IRTC interface, the module instance object is also the trace instance object.

The only argument to rtcGet( ) is a trace instance handle.

The following condition must be true prior to calling this function;

otherwise, its operation is undefined: the argument must be a valid handle for the module's trace instance object.

The following condition is true immediately after returning from this method: mask is the current trace mask setting for this instance.

The code segment in Table 14 is an example implementation of rtcGet.

TABLE 14

Example Implementation of rtcGet

```
typedef struct EncoderObj {
    IALG_Obj ialgObj      /* IALG object MUST be first field */
    Int workBuf;          /* pointer to on-chip scratch memory */
    ...;
    IRTC_Mask mask;       /* current trace mask */
} EncoderObj;
IRTC_Mask rtcGet (IRTC_Handle handle)
{
    EncoderObj *inst = (EncoderObj *)handle;
    /* return current trace mask */
    return (inst->mask);
}
```

The function rtcSet( ) sets a new trace mask for a trace instance object. For any module that implements the IRTC interface, the module instance object is also the trace instance object.

The first argument to rtcSet( ) is a trace instance handle and the second argument is the new setting for this instance.

The following condition must be true prior to calling this function; otherwise, its operation is undefined: handle must be a valid handle for the module's trace instance object.

The following conditions are true immediately after returning from this function.

The trace levels specified in the mask are enabled for this instance. This instance emits the specified trace information during its execution.

Although the execution time for the module's functions may change slightly, all of the module's functions continue to execute as they would have if rtcSet( ) had not been called.

The code segment in Table 15 is an example implementation of rtcSet.

TABLE 15

Example Implementation of rtcSet

```
typedef struct EncoderObj {
    IALG_Obj ialgObj      /* IALG object MUST be first field */
    Int workBuf;          /* pointer to on-chip scratch memory */
    ...;
    IRTC_Mask mask;       /* current trace mask */
} EncoderObj;
Void rtcSet (IRTC_Handle handle, IRTC_Mask mask)
{
    EncoderObj *inst = (EncoderObj *)handle;
    /* set current trace mask */
    inst->mask = mask;
    ...;                  /* enable trace modes indicated
                             by mask */
}
```

Packaging

Once a module is developed, it must be packaged in a uniform manner to enable delivery into any framework that conforms to the component model described herein. To ensure that a single component can be used in both UNIX and Windows environments, never create two files whose names only differ in case, and always treat file names as being case-sensitive.

All of the object code files for a module should be archived, into a library with the following name: <module><vers>_<vendor>.a<arch> where <module> is the name of the module (containing alphanumeric characters only)

<vers> is an optional version number of the form v<num> where num is numeric

<vendor> is the name of the vendor (containing alphanumeric characters only)

<arch> is an identifier indicating the DSP architecture

In addition to the object code implementation of the algorithm, each module includes one or more interface headers. To ensure that no name conflicts occur, all header files must conform to the following naming conventions. C language headers should be named as follows:

<module><vers>_<vendor>.h.

Assembly language headers should be named as follows:

<module><vers>_<vendor>.h<arch>.

A single vendor may produce more than one implementation of an algorithm module. For example, a "debug" version may include function parameter checking that incurs undesirable overhead in a "release" version. A vendor may even decide to provide multiple debug or release versions of a single algorithm. Each version may make different tradeoffs between time and space overhead, for example. To easily manage the common case of debug and release versions of the same algorithm, different versions of an algorithm from the same vendor must follow a uniform naming convention. If multiple versions of the same component are provided by a single vendor, the different versions must be in different libraries (as described above) and these libraries must be named as follows:

<module><vers>_<vendor>_<variant>.a<arch> where <variant> is the name of the variant of the module (containing alphabetic characters only). Debug variants must have variant names that begin with the characters "debug".

If there is only one release version of a component from a vendor, there is no need to add a variant suffix to the library name. Suppose, for example, that TI supplies one debug and one release version of the FIR module for a DSP that is referred to as a C62xx architecture. In this case, the library file names would be "fir_ti_debug.a62" and "fir_ti.a62".

To avoid having to make changes to source code, only one header file must suffice for all variants supplied by a vendor. Since different algorithm implementations can be interchanged without re-compilation of applications, it should not be necessary to have different "debug" versus "release" definitions in a module's header. However, a vendor may elect to include vendor specific extensions that do require recompilation. In this case, the header must use the symbol _DEBUG to select the appropriate definitions; _DEBUG is defined for debug compilations and only for debug compilations.

Figure 23A:
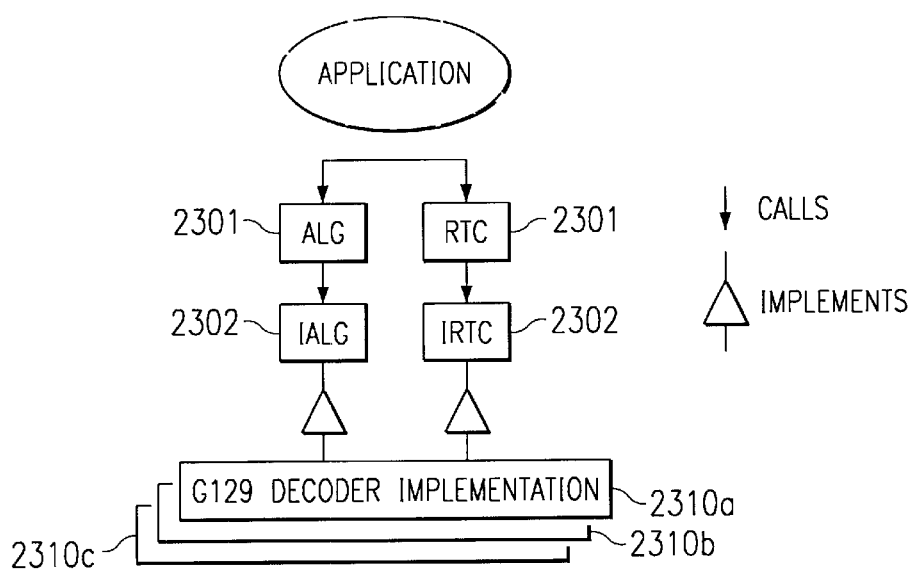
FIG. 23A is a block diagram of an example algorithm module that includes both an IALG interface and an IRTC interface.

FIG. 23A is a block diagram of an example algorithm module that includes an IRTC interface. In this example, several instances 2310a–c of a G729 decoder algorithm are interfaced by a common interface. In an embodiment of the present invention, the framework that is integrated with algorithms implemented as described above must incorporate functionality that interfaces with the algorithms following the guidelines set out in the flowchart in FIG. 8. The next few paragraphs provide an example of this embodiment. The example is presented in the form of two modules, ALG and RTC, that conform to the guidelines for modules described above. The ALG module provides for the creation and management of algorithm instances. The RTC module provides for the enabling, disabling, and configuring of the trace modes of any algorithm module.

The relationship of these interfaces to the abstract interfaces defined above is illustrated in FIG. 23A. Abstract interfaces 2302 correspond to API modules 2301. API modules 2301 provide conventional functional interfaces to any modules that implement the corresponding abstract interfaces 2302.

The ALG module provides a generic interface used to create, delete, and invoke algorithms on data. The functions provided by this module use the IALG interface functions to dynamically create and delete algorithm objects. Any module that implements the IALG interface can be used by ALG.

Note that there may actually be several different implementations of the ALG module available in the software development environment. Each implementation would follow a different memory management policy and optimally operate in a specified environment. For example, one implementation may never free memory and should only be used in applications that never need to delete algorithm objects. An implementation of ALG would be incorporated into a framework or test program as follows: #include <alg.h>.

The interface to ALG is presented in Table 16.

TABLE 16

| ALG Interface |
|---|
| /*-------------------------*/ |
| /* TYPES AND CONSTANTS */ |
| /*-------------------------*/ |
| typedef IALG_Handle ALG_Handle; |
| /*-------------------------*/ |
| /* FUNCTIONS */ |
| /*-------------------------*/ |
| ALG_activate ();    /* initialize instance's scratch memory */ |
| ALG_control ();     /* send control command to algorithm */ |
| ALG_create ();      /* create an algorithm instance object */ |
| ALG_deactivate (); /* save instance's persistent state */ |
| ALG_delete ();      /* delete algorithm instance's object */ |
| ALG_exit ();        /* ALG module finalization */ |
| ALG_init ();        /* ALG module initialization */ |

ALG_activate( ) initializes any scratch buffers and shared persistent memory using the persistent memory that is part of the algorithm's instance object. In preemptive environments, it saves all shared data memory used by this instance to a shadow memory so that it can be restored by ALG-deactivate( ) when this instance is deactivated. The only argument to ALG_activate(0 is an algorithm instance handle. This handle is used by the algorithm instance to identify the various buffers that must be initialized prior to execution of any processing functions. It has no return value.

ALG_create( ) implements a memory allocation policy and uses this policy to create an instance of the algorithm module specified in its first argument (of type IALG_Fxns). Its second argument is a pointer (of type IALG_Params) to an algorithm-specific set of instance parameters that are required by the algorithm module to create an instance. ALG_create( ) will return a handle to the instance if it is successful. If it is unsuccessful, it will return NULL.

The code fragment in Table 17 shows an example use of ALG_create.

TABLE 17

Example of ALG_create and ALG_delete Use

```
#include <alg.h>
#include <encode.h>
Void main()
{
    ENCODE_Params params;
    ALG_Handle encoder;
    params =ENCODE_PARAMS; /* initialize to default values */
    params.frameLen = 64; /* set frame length */
    /* create instance of encoder object */
    encoder = ALG_create(&ENCODE_TI_IALG,
        (IALG_Params*) &params);
    if (encoder != NULL) {
        /* use encoder to encode data */
        ...
    }
    /* delete encoder object */
    ALG_delete (encoder);
}
```

ALG_control( ) sends an algorithm specific command and a pointer to an I/O status buffer. The first argument to ALG_control( ) is an algorithm instance handle. The second two arguments, the command and the pointer to the I/O status buffer, are interpreted in an algorithm-specific manner by the implementation. The return value of ALG_control( ) indicates whether the control operation completed successfully. A return value of IALG_EOK indicates that the operation completed successfully; all other return values indicate failure. The code fragment in Table 18 contains an example of the use of ALG_control( ).

TABLE 18

Use of ALG_control()

```
#include <alg.h>
#include <encode.h>
Void main()
{
    ALG_Handle encoder;
    ENCODE_Status status;
    /* create instance of encoder object */
    encoder = . . .;
    /* tell coder to minimize MIPS */
    status.u.mips = ENCODE_LOW
    ALG_control(encoder, ENCODE_SETMIPS,
        (ALG_Status *) &status);
    ...
}
```

ALG_deactivate( ) saves any persistent information to non-scratch buffers using the persistent memory that is part of the algorithm's instance object. In preemptive environments, ALG_deactivate( ) also restores any data previously saved to shadow memory by ALG_activate( ). The only argument to ALG_deactivate( ) is an algorithm instance handle. This handle is used by the algorithm to identify the various buffers that must be saved prior to the next cycle of ALG_activate( ) and data processing calls.

ALG_delete( ) deletes the dynamically created object indicated by its only argument. The handle denoted by this argument should be the return value from a previous call to ALG_create( ). If handle is NULL, ALG_delete( ) simply returns. It has no return value. Table 18 shows an example of the use of ALG_delete( ).

ALG_init( ) is called during system startup to perform any run-time initialization necessary for the algorithm module as a whole. It has no parameters and returns nothing.

ALG_exit( ) is called during system shutdown to perform any run-time finalization necessary for the algorithm module as a whole. It has no parameter and returns nothing.

The RTC module provides a generic interface used to control the trace capabilities of an algorithm instance. The functions provided by this module use the IRTC interface functions to dynamically control the various trace levels supported by algorithm objects. Any module that implements the IRTC and IALG interfaces can be used by RTC. Table 19 contains an example of the RTC interface. This interface would be incorporated in the framework by the directive #include <rtc.h>.

TABLE 19

RTC Interface

```
/*--------------------------*/
/* TYPES AND CONSTANTS */
/*--------------------------*/
#define RTC ENTRY          IRTC_ENTRY
#define RTC WARNING        IRTC_CLASS1
typedef struct RTC_Desc  }
    IRTC_Fxns fxns; /* trace functions */
    IALC_Handle handle; /* algorithm instance handle */
} RTC_Desc;
/*--------------------------*/
/* FUNCTIONS */
/*--------------------------*/
RTC_bind ();         /* bind output log to module */
RTC_create ();       /* create a trace instance object */
RTC_delete ();       /* delete trace instance's object */
RTC_disable ();      /* disable all trace levels */
RTC_enable ();       /* (re)enable trace levels */
RTC_exit ();         /* RTC module finalization */
RTC_get ();          /* get trace level */
RTC_init ();         /* RTC module initialization */
RTC_set ();          /* set trace level */
```

RTC_bind( ) sets the output log of a module. This operation is typically called during system initialization and it must not preempt any other operation supported by the implementing module. Its first argument must be a pointer to a module's implementation of the IRTC interface. The second argument must be a valid pointer to a LOG object.

RTC_create( ) initializes the trace descriptor structure. Its first argument is a pointer to a trace descriptor structure. This structure is initialized using the algorithm object and a pointer to a module's IRTC implementation functions. The second argument is pointer to an algorithm object previously created by ALG_creates( ). The third argument must be a pointer to a module's implementation of the IRTC interface. This module must also implement the IALG interface used to construct the ALG_Obj structure. RTC_create performs a run-time check to insure these two interface implementations are consistent. RTC_create( ) returns NULL if it fails; otherwise, it returns its first argument.

RTC_delete( ) deletes the trace descriptor contained in its only argument. This trace descriptor should have been initialized by RTC_create( ). If the parameter is NULL, RTC_delete( ) simply returns. RTC_delete( ) returns nothing.

RTC_disable( ) sets the current trace bit mask for the instance object to a value the halts the real-time production of diagnostic information by the trace object. The first argument to RTC_disable( ) is a trace descriptor initialized via RTC_create( ). If this argument is NULL, RTC_disable simply returns. RTC_disable returns nothing.

RTC_enable( ) sets the current trace bit mask for the instance object to the last set value representing the level of trace and diagnostic information that should be produced in real-time by the trace object. The first argument to RTC_enable( ) is a trace descriptor initialized via RTC_create( ). If this argument is NULL, RTC_enable simply returns. RTC_enable returns nothing.

RTC_exit( ) runs during system shutdown to perform any run-time finalization necessary for the RTC module as a whole. It has no arguments and returns nothing.

RTC_get( ) returns the current setting of the trace mask for a trace descriptor. The only argument to RTC_get( ) is a trace descriptor initialized via RTC_create( ). Table 20 contains a code fragment illustrating the use of RTC_get( ).

TABLE 20

Use of RTC_get

```
main ()
{
    RTC_Desc trace;
    ALG_Handle alg;
    alg = . . .;
    RTC_create(&desc, alg, &FIR_TI_IRTC);
    /* get current trace mask for alg */
    mask = RTC_get (&desc);
    . . .
}
```

RTC_init( ) is called during system startup to perform any run-time initialization necessary for the RTC module as a whole. It has no arguments and returns nothing.

RTC_set( ) the current trace mask for an algorithm instance specified by the descriptor pointer passed as its first argument. This pointer must be a trace descriptor initialized via RTC creates. The second argument is a bit mask representing the level of trace and diagnostic information that should be produced in real-time by the trace object. This function returns nothing. Table 21 contains a code fragment illustrating the use of RTC_set.

TABLE 21

Use of RTC-set()

```
main ()
{
    RTC_Desc trace;
    ALG_Handle alg;
    alg = . . .;
    RTC_create(&desc, alg, &FIR_TI_IRTC);
    /* set current trace mask for alg to RTC_ENTER */
    RTC_set (&desc, RTC_ENTER);
    . . .
}
```

Figure 23B:
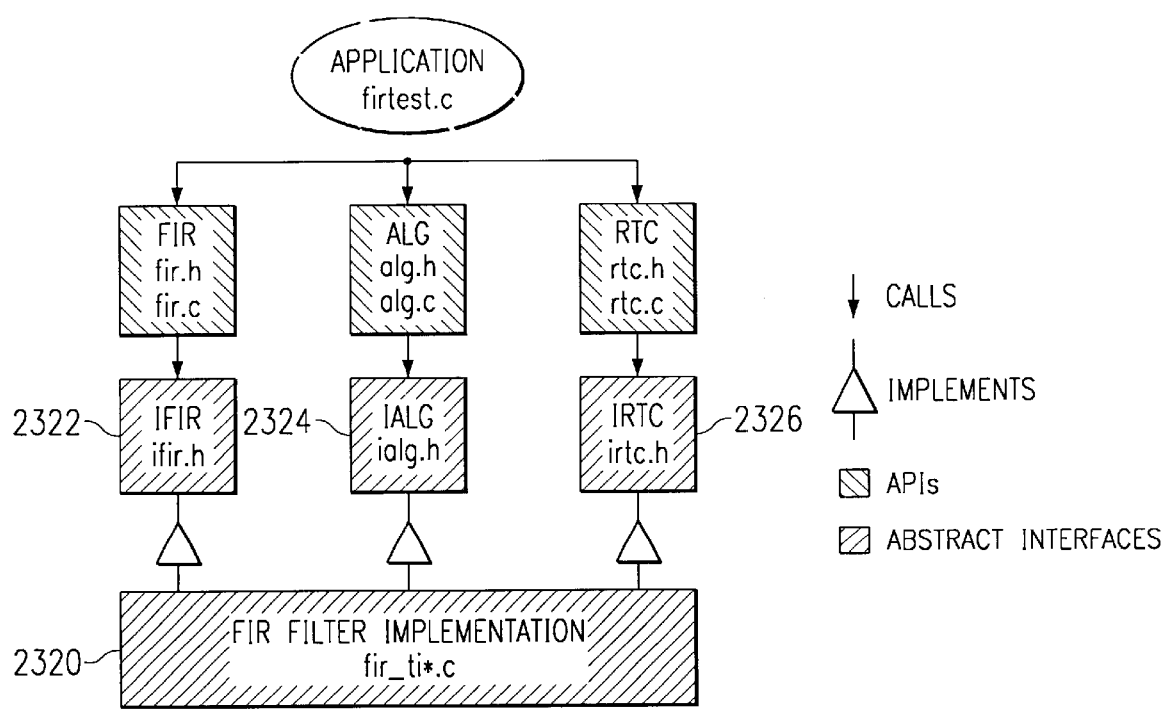
FIG. 23B is a block diagram of another example algorithm module that embodies the present invention and that illustrates a function calling interface, an IALG interface and an IRTC interface.

FIG. 23B is a block diagram of another example algorithm module that illustrates an abstract algorithm interface 2322, an IALG interface 2324 and an IRTC interface 2326. This example represents a finite impulse response (FIR) algorithm 2320. Appendix A contains the complete source code for this example as well as a second example of algorithm modules that exemplify an embodiment of the current invention. Note that these examples presume the existence of a framework that implements the ALG and RTC interfaces described in the preceding paragraphs.

Dynamic Instantiation

FIG. 20A is a flow graph illustrating a method for managing memory usage in a software program comprised of a framework and some number of algorithm modules in which algorithm modules are dynamically instantiated.

In step 2007, an algorithm instruction code section is encapsulated with a memory interface code section to create an algorithm module. In step 2001, the algorithm modules are combined with a framework. Each algorithm module has a memory interface that responds to a memory allocation inquiry (or query) with the memory usage requirements of an algorithm instance. This step creates the software system. The software system is loaded on a hardware platform in step 2002. In step 2003, the software system is executed.

The flow graph in FIG. 20B illustrates the execution steps. In steps 2004 and 2005, client 2009 (a framework) queries the memory interface of algorithm module 2010 to get the memory usage requirements of an instance of the algorithm. Algorithm module 2010 responds to the memory allocation inquiry by returning the memory usage requirements for an instance of the algorithm. In step 2006, client 2009 allocates physical memory for algorithm instance 2011 based on the memory usage requirements it received. In step 2008a, algorithm module 2010 accepts the region of memory allocated by client 2009. Algorithm module 2010 then initializes the region of memory to create algorithm instance 2011 in step 2008b. Steps 2004–2008b is repeated for each algorithm module in the software program.

In an embodiment of the present invention, each algorithm module would be implemented as a module as described above. The memory interface of each algorithm would be provided by implementing the IALG interface shown in FIG. 7 (without code block 708 and code block 709 and code lines 714 in FIG. 7A) and the three required functions, algAlloc( ), algInit( ), and algFree( ). These three functions implement the basic functionality for an algorithm's memory handling capability.

The algorithm modules would then be linked with a framework that is able to call the functions of the memory interface at the appropriate times with correct parameter values. The resulting software system is then loaded on the target hardware platform and executed.

When execution begins, the framework will call algAlloc( ) for each algorithm module in turn to determine the memory usage requirements. It allocates the requested memory as defined in the memTab structure and then calls algInit( ) to initialize the memory requested in algAlloc( ). This execution sequence of algAlloc( ) followed by algInit( ) is done one time for each algorithm module in the system to allocate and initialize all memory required by the set of algorithm modules. The framework then may execute any of the algorithm-specific functions in any of the algorithm modules.

Alternatively, the framework may chose to execute the sequence of algAlloc( ) followed by algInit( ) each time it wishes to execute any of the algorithm specific functions of a given algorithm module. When the desired algorithm specific functions have completed execution, the framework can then execute algFree( ) to get the addresses and size of each memory block allocated to the algorithm module and free up that memory for use by another algorithm module.

Memory Optimization

In other embodiments of the invention, additional functionality is provided to enable optimal memory utilization. The memory interface of the above embodiment informs the framework of the amount of memory required by the algorithm module. Many DSP systems provide several memory spaces. These memory spaces include:

Dual-access memory (DARAM)—on-chip memory that allows two simultaneous memory accesses in a single instruction cycle Single-access memory (SARAM)—on-chip memory that allows only a single memory access per instruction cycle External memory—memory that is external to the DSP that may require more than zero wait states per memory access.

Figure 21:
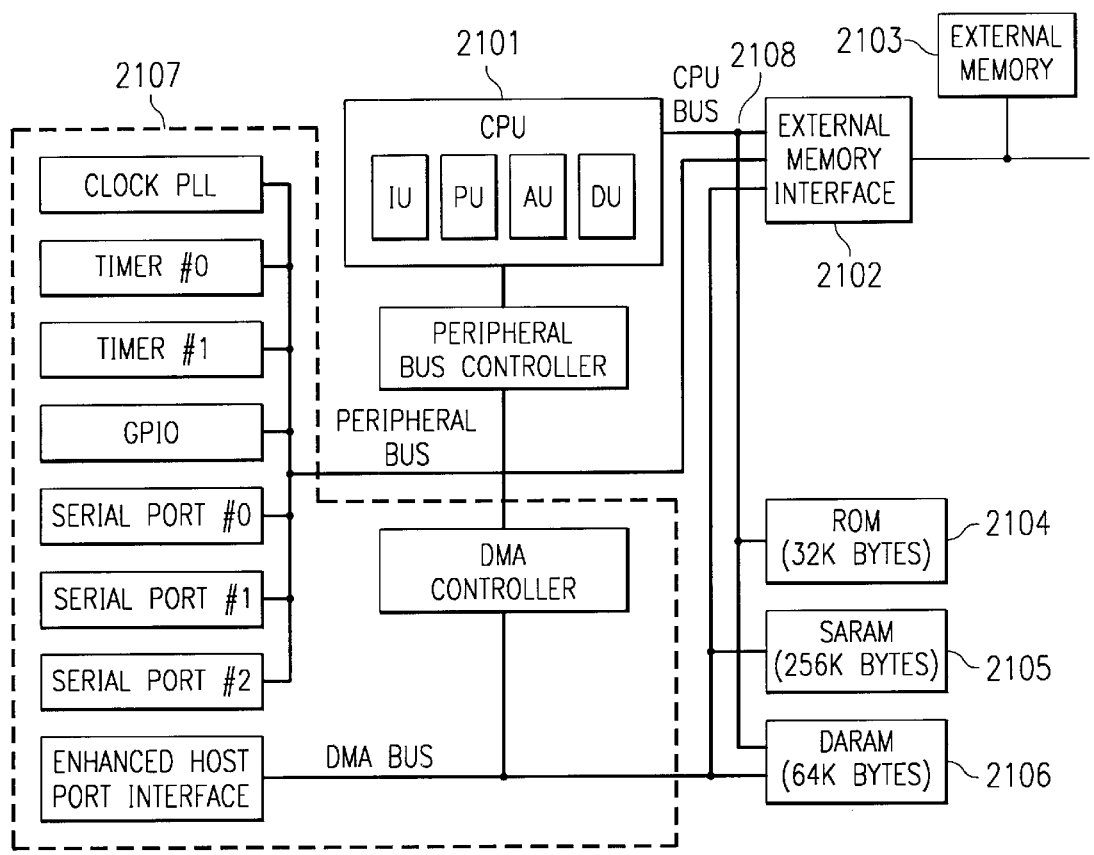
FIG. 21 is a block diagram illustrating an architecture of a digital system with several different memory spaces and types of memory that can be requested and allocated for use by algorithm module instances in an embodiment of the present invention.

FIG. 21 is a block diagram illustrating an architecture of a digital system with several different memory spaces and types of memory. The processor represented is a programmable fixed point digital signal processor (DSP) core with variable instruction length (8 bits to 48 bits) offering both high code density and easy programming, such as a TMS320C5510, available from Texas Instruments Incorporated, for example. The architecture and instruction set are optimized for low power consumption and high efficiency execution of DSP algorithms as well as pure control tasks, such as for wireless telephones, for example. It includes emulation and code debugging facilities.

As shown in FIG. 21, the processor is formed of a central processing unit (CPU) 2101, an external memory interface unit 2102 for interfacing CPU 2101 with external memory unit 2103, on-chip random access memory (RAM) comprised of read only memory (ROM) 2104, single-access RAM (SARAM) 2105, and dual-access RAM (DARAM) 2106, and a number of on-chip peripherals 2107. External memory interface 2102, ROM 2104, SARAM 2105, and DARAM 2106 are connected to CPU 2101 by CPU bus 2108.

These memory spaces (external memory 2103, ROM 2104, SARAM 2105, and DARAM 2106) are only the most common types used today. Other types may exist now or come into existence in the future. Extension of the present invention to include these should be obvious to one skilled in the art.

Algorithm developers will structure their implementations to take advantage of the available memory spaces to optimize performance. For example, frequently accessed data will usually be placed in on-chip memory (e.g., SARAM 2105 and DARAM 2106).

For DSP system architectures that include more than one memory space (as exemplified in FIG. 21), the memory interface of the inverted memory protocol is extended to include the ability to inform the framework of the desired memory space for each block of memory requested. Code lines 1302 and 1304 in FIG. 13 illustrate this embodiment. (Code block 708 and the first line of code line 714 in FIG. 7A are now included in IALG to define the memory space types.)

Once a memory block's size, alignment, and memory space have been specified, three independent questions must be answered before a framework can optimally manage a block of an algorithm's data memory:

Is the block of memory treated as scratch or persistent?
Is the block of memory shared by more than one algorithm instance?
Do the algorithm instances that share the block preempt one another?

The answer to the first question is determined by the implementation of the algorithm module. In an alternate embodiment, the memory interface is further extended to include the capability to adopt a model of using scratch memory versus persistent memory. This capability allows an algorithm module to divide its memory into two or more blocks. This subdivision of memory helps reduce fragmentation of physical memory and allows the framework to make more efficient use of physical memory since the area allocated to scratch memory can be shared among all algorithm modules in the application.

Figure 22:
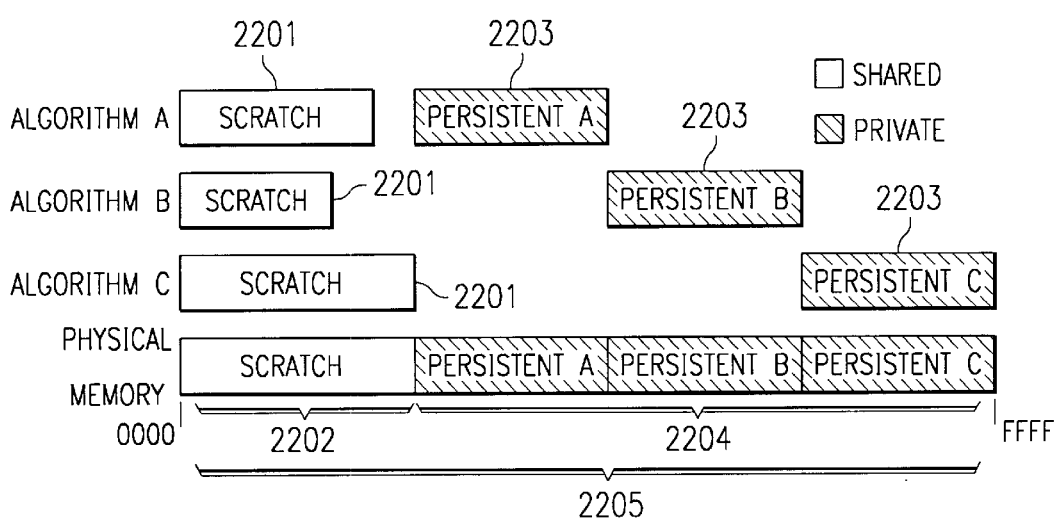
FIG. 22 is an illustration of various types of memory, such as persistent memory and scratch memory, which can be requested by algorithm instances within the digital system of FIG. 21.

In this model, all physical memory is partitioned into two groups: scratch and persistent. Scratch memory may be freely used by an algorithm instance without regard to its prior contents, i.e., no assumptions about the content can be made by the algorithm instance and the algorithm instance is free to leave it in any state. Persistent memory is used to store state information while an algorithm instance is not executing. An algorithm instance can assume that the contents of persistent memory are unchanged between successive invocations. All physical memory has this behavior, but applications that share memory among multiple algorithm modules may opt to overwrite some regions of memory. The importance of making a distinction between scratch memory and persistent memory is illustrated by FIG. 22. Without this distinction, physical memory 2205 would have to be strictly partitioned among algorithm instances, making the total physical memory requirement the sum of all algorithms' memory requirements. On the other hand, with this distinction, algorithm scratch memory 2201 can be overlaid on the same physical memory 2202. And, physical memory 2204 can be strictly partitioned for algorithm persistent memory 2203. Thus, the total memory requirement for a collection of algorithm instances is the sum of the size of each algorithm's persistent memory plus the maximum scratch memory size requirement of any of these algorithms.

The other two questions, regarding sharing and preemption, can only be answered by the framework. The framework decides whether preemption is required for the application and the framework allocates all memory. Thus, only the framework "knows" whether memory is shared among algorithm instances. Some frameworks, for example, never share any allocated memory among algorithm instances while others always share scratch memory. Since only the framework knows about sharing and preemption, the memory interface of the present invention is extended in an alternate embodiment to include a way of telling the framework if the requested memory is to be treated as scratch or persistent. Code lines 1301 and 1303 in FIG. 13 are examples of such an extension. (Code block 709 and the second line of code lines 714 in FIG. 7A are now added to IALG.)

The scratch versus persistent attribute of a block of memory is independent of the memory space. Thus, there are six distinct memory classes in the above embodiment of the present invention: scratch and persistent for each of the three memory spaces. For example, in FIG. 13, code lines 1301 and 1302 in combination specify that the requested memory block is to be persistent and should be located in external memory. And, code lines 1303 and 1304 in combination specify that the requested memory block is to be persistent and should be located in on-chip dual-access memory.

There is a special type of persistent memory that some frameworks implement, shadow memory. Shadow memory is unshared persistent memory that is used to save the contents of shared registers and memory in an application. Algorithms are not aware of shadow memory; frameworks use it to save the memory regions shared by various algorithm instances.

Because algorithm instances use persistent memory to hold state information between executions, persistent memory blocks will usually be assigned to slow external physical memory. When an algorithm instance has a frame of data to be processed, the state information needed for processing the frame should be copied into a scratch buffer in a faster on-chip memory space. An alternate embodiment of the present invention extends the capabilities of the memory interface to include functionality to execute the "copy to scratch memory" operation. FIG. 12, in code segment 1201, illustrates one implementation of such functionality, algActivate( ). When a framework wishes to start the execution of an algorithm instance's processing functions, it should call this function before calling any of the processing functions.

When the processing of the buffer is complete, the framework may decide to assign the scratch buffer to another instance of that algorithm or to another algorithm instance. But the current instance may need to retain some of the information in its scratch buffer. This information needs to be copied back to the persistent memory. An alternate embodiment of the present invention extends the capabilities of the memory interface to include functionality to execute the "copy to persistent memory" operation. FIG. 12, in code segment 1202, illustrates one implementation of such functionality, algDeactivate( ). When a framework wishes to reuse a scratch buffer, it should call this function for the last algorithm instance using the scratch buffer before allocating the buffer to another.

The framework decides if it wants to execute "copy to scratch memory" and "copy to persistent memory" for every frame of data, or if it wants to call "copy to persistent memory" and never share the scratch memory with other algorithm instances until it calls "copy to persistent memory".

The ability to relocate or move a memory block allocated to an algorithm will further improve application designers' ability to optimize memory usage by giving them increased flexibility to move algorithm instances around at runtime. However, if a framework moves a memory block, it must make provisions for assuring that the algorithm instance can update any internal references to that memory block. An alternate embodiment of the present invention includes functionality that extends the memory interface to allow the framework to notify the algorithm instance that its memory block has been moved. Code segment 1701 in FIG. 17 illustrates one implementation of this functionality, algMoved( ). An algorithm implementing this function is only responsible for updating the internal references to its memory blocks.

Existing Algorithms

As other embodiments described herein have shown, it is possible with the present invention to write algorithms that may be used in more than one system or application without significant reengineering, integration, and testing. These embodiments have dealt mostly with the creation of new algorithms. They do not address algorithms that were in existence prior to the present invention. There is a large body of such algorithms that have taken years to develop and refine.

Figure 24:
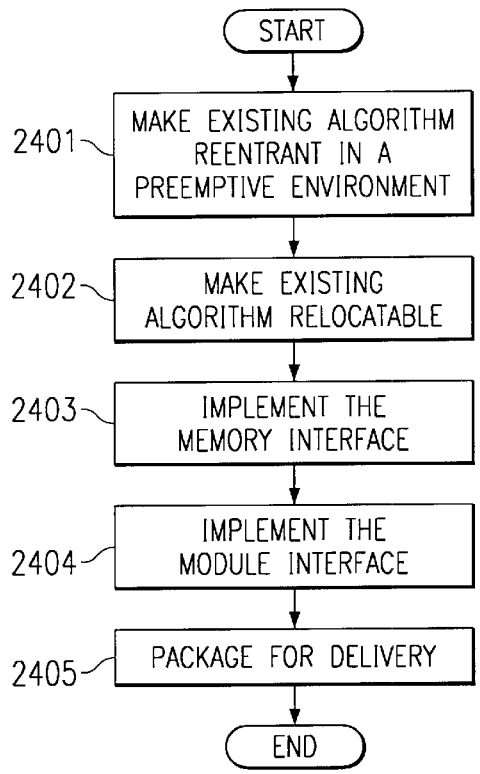
FIG. 24 is a flow chart for another embodiment of the present invention that is a method of converting an existing algorithm to an algorithm module so that it may be used in the flow of FIG. 8.

In another embodiment of the present invention, there is a method of converting an existing algorithm to an algorithm module so that it may be used in any framework providing the defined interface. The steps of this method are shown in the flowchart in FIG. 24.

For purposes of illustrating this method, we assume the existence of an implementation of an encoder algorithm. In steps 2401 and 2402, the actual code of the algorithm is modified as required to make the existing algorithm reentrant in a preemptive environment and to make it relocatable. These modifications are considered to be good coding practice and how to accomplish them is well understood by practitioners. Other programming rules or guidelines may also be applied such as those described previously herein.

In step 2403, code is written to implement the basic memory interface. This consists of implementing the IALG interface described previously along with the three required functions, algAlloc, algInit, and algFree. Table 22 contains an example of the algAlloc function for the example algorithm.

TABLE 22 algAlloc Example

```
Int G723ENC_TI_algAlloc (const IALG_Params *algParams,
IALG_Fxns **pf, IALG_MemRec memTab[ ] )
{
/* Request memory for G723ENC instance object */
memTab[0].size = sizeof(G723ENC_TI_Obj);
memTab[0].alignment = 0;
memTab[0].space = IALG_DARAM0;
memTab[0].attrs = IALG_PERSIST;
return(1) /* return number of memory blocks requested */
}
```

Table 23 contains an example of the algInit function for the example algorithm.

TABLE 23 algInit Example

```
Int G723ENC_TI_algInit (IALG_Handle handle, const IALG_MemRec
memTab[ ], IALG_Handle p, const IALG_Params *algParams)
{
    G723ENC_TI_Obj *enc = (Void *)handle;
    const IG723ENC_Params *params = (Void *)algParams;
    if (params == NULL) {
      params = &IG723ENC_PARAMS;   /* set default parameters */
    }
    /* copy creation params into the object */
    enc->workingRate = params->rate;
    enc->hPFilter = params->hpfEnable;
    enc->VAD = params->vadEnable;
    g723EncInit (enc); /* Initialize all other instance variables */
    return (IALG_EOK);
}
```

Table 24 contains an example of the algFree function for the example algorithm.

TABLE 24 algFree Example

```
Int G723ENC_TI_algFree (IALG_Handle handle, IALG_MemRec
memTab[ ])
{
    G723ENC_TI_Obj *enc = (Void *) handle;
    algAlloc(NULL, NULL, memTab);   /*Fill the memTab struct */
    memTab[0].base = (Void *)&enc;
    return(1);
}
```

The algorithm code must be implemented in an object-like way to encapsulate state. This is good coding practice and motivates reentrant code since all references to the code and data will be through a pointer to the object. Consider the example of the G723ENC_TI_Obj in Table 25.

TABLE 25

G723ENC_TI_Obj Example

```
typedef struct G723ENC_TI_Obj {
    IALG_Obj ialg;            /* Points to the v-table */
    IG723_Rate workingRate;   /* 5.3 or 6.3 kbps */
    XDAS_Bool hPFilter;       /* High Pass filter on/off */
    XDAS_Bool VAD;            /* Voice activity detection on/off */
    ..................../* specifics to the implementation */
} G723ENC_TI_Obj;
```

Notice that the first field in the object is IALG_Obj, which is a pointer to the v-table created later in this step. This parameter must be the first field in any object definition. It is the framework's responsibility to initialize this pointer to point to the v-table when creating an instance of the algorithm module. Also, G723ENC_TI_Obj must occupy the first block of memory, memTab[0].

Next, in step 2404, the specific module interface, the IG723ENC interface, must be created. The IG723ENC interface is defined in the ig723enc.h header file. IG723ENC_Fxns extends IALG_Fxns, as seen in the excerpt from the header file in Table 26.

TABLE 26

Excerpt From ig723enc.h

```
typedef struct IG723ENC_Fxns {
    IALG_Fxns ialg;          /* IG723ENC extends IALG */
    XDAS_Bool (*control) (IG723ENC_Handle handle, IG723_Cmd cmd,
    IG723ENC_Status *status);
    XDAS_Bool (*encode) (IG723ENC_Handle handle, XDAS_UInt16
    *in, XDAS_UInt16 *out);
} IG723ENC_Fxns;
```

The control( ) and encodes functions must be implemented to complete the module interface for the algorithm. Most often, these functions are wrappers to existing implementations, as seen in the example in Table 27 for the encode( ) function.

TABLE 27 encode() Function

```
XDAS_Bool G723ENC_TI_encode(IG723ENC_Handle handle,
XDAS_UInt16 *in, XDAS_UInt16 *out)
{
    G723ENC_TI_Obj *enc = (Void *)handle;
    if(encoder(enc, in, out))        /* do the processing */
        return(XDAS_TRUE);
    rerurn (XDAS_FALSE);
}
```

The IG723ENC interface defines the default creation parameters in the ig723enc.c source file. If the framework wants to use creation parameters other than those provided in the interface, the framework makes a local copy of the default algorithm parameters and modifies the desired fields before creating an instance. The application then needs to pass this modified parameter structure to algAlloc( ) and algInit( ) to create an instance with the modified parameters.

Finally, the v-table must be defined so the framework can access the algorithm module's functions. Since IG723ENC_Fxns extends IALG_Fxns, the IG723ENC v-table must also include the functions in the IALG v-table as shown in Table 28.

TABLE 28

V-table Definition

```
#define IALGFXNS\
    &G723ENC_TI_IALG,        /* module ID */ \
    NULL,                     /* activate */ \
    G723ENC_TI_algAlloc,      /* alloc */ \
    NULL,                     /* control */ \
    NULL,                     /* deactivate */ \
    G723ENC_TI_algFree,       /* free */ \
    G723ENC_TI_algInit,       /* init */ \
    NULL,                     /* moved */ \
    NULL                      /* numAlloc */ \
```

TABLE 28-continued

V-table Definition

```
IG723ENC_Fxns G723ENC_TI_IG723ENC = {
    IALGFXNS,                /* IALG-functions */
    G723ENC_TI_control,
    g723ENC_TI_encode
} G723ENC_TI_IG723ENC;
asm(" G723ENC_TI_IALG .set G723ENC_TI_IG723ENC");
```

The first field in the v-table is the address of the table. This field is used as a unique identifier of the implementation. Notice that only the three required IALG functions and the module-specific functions are defined in the v-table. All the other function pointers are set to NULL. The asm( ) statement defines the symbol G723ENC_TI_IALG to be equal to G723ENC_TI_IG723ENC, which means that the IALG and the IG723ENC v-tables are shared.

The algorithm module is now ready for final testing and packaging for delivery (step 2405). A library and a header file are created as described in previously herein. The library file will be called g723enc_ti.a62. The header file, g723enc_ti.h, needs to declare the symbols to the v-table as shown in Table 29.

TABLE 29

V-table Symbol Declarations in Header File

```
extern IG723ENC_Fxns G723ENC_TI_IG723ENC;
extern IALG_Fxns G723ENC_TI_IALG;
```

After following the steps described above, an algorithm module that meets the goal of reusability without change has been created. However, the algorithm module does not yet provide for optimum memory management on the part of the framework. Several improvements may optionally be applied.

In the G723ENC_TI_algAlloc( ) function, a single block of memory holds the state information and potential working buffers. An algorithm module should divide its memory requirements into several blocks for three reasons. First, it makes memory management more flexible for the framework with regards to fragmentation issues. Second, the framework can make efficient use of any scratch memory since it can be overlaid among instances of algorithms. Third, if the target hardware supports them, the memory blocks can be allocated in different types of physical memory depending on their usage. An extension to this embodiment to support specification of scratch versus persistent memory and different types of memory should be apparent from the description of a previous embodiment.

For increased flexibility in optimizing memory usage, the algorithm module should be extended to permit an algorithm instance to be activated, deactivated, and relocated by the framework at run-time. In this embodiment, this functionality is provided by implementing the functions algActivate( ), algDeactivate( ), and algMoved( ). These functions are described previously herein.

One final thing that may be done in the conversion process is to provide an interface to any debugging functionality that the DSP operating system may support. In this embodiment, this would be accomplished by implementing the IRTC interface described previously.

"Design Time" Object Instantiation

The present invention allows system designers to easily integrate algorithm modules from a variety of sources (e.g., third parties, customers, etc.). However, in system design, flexibility comes with a price. This price is paid in CPU cycles and memory space, both critical in all DSP systems, but perhaps most critical in a static system. A static system is one in which no memory allocation occurs at run-time. The worst-case amount of memory needed to execute the application can be determined when the software system is designed (at "design time") and that memory can be allocated statically among the algorithm modules in the software system. This static memory allocation is then initialized at run-time. There is no need for run-time memory allocation. Note that static systems may reuse memory. They will, for example, overlay algorithm instances in the same physical memory when it is known that the instances are never concurrently active.

In contrast, a dynamic system is one in which the memory is allocated and initialized while the application is executing. A dynamic system takes advantage of the available physical memory by sharing it between algorithm instances, by reclaiming it when an algorithm instance is deactivated, and by reusing it when another algorithm instance is activated.

Recall from previous discussion of an embodiment of the invention that an algorithm module is a module that manages instances of a single type of object. It also supports dynamic or run-time creation of those instances. Another embodiment of the present invention is a system and method for creating algorithm instances at "design time" rather than dynamically at run-time. This method will allow an algorithm to be used effectively in a static system with limited memory.

In an embodiment described previously, an interface that allows efficient use of a large variety of algorithm modules in a large variety of systems is presented. However, the full capability of the interface may not be necessary in all systems. For a static system, a designer would want to allocate memory to any algorithm instances at design time, initialize the algorithm instances at power-on and never change anything else. In such a system, the code implementing memory allocation and de-allocation would take up valuable memory and would never be used.

Figure 25:
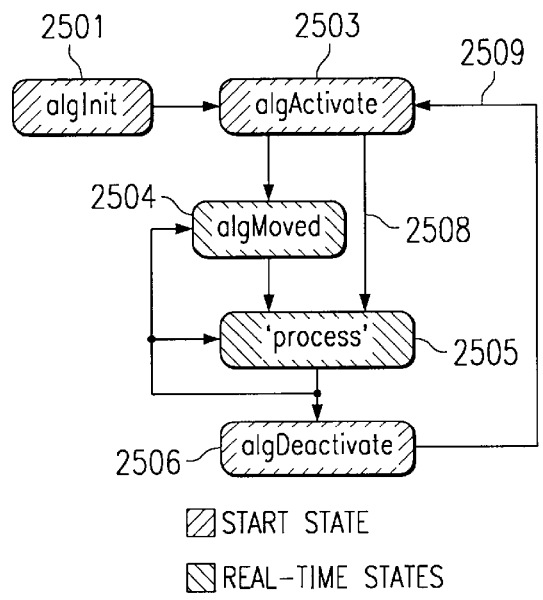
FIG. 25 is a flow graph illustrating the use of a memory interface function of an algorithm module that has been instantiated at "design time"

FIG. 25 is a flow chart illustrating the valid sequences of execution of the functions in an algorithm module interface after it has been instantiated at "design time". Note that several of the interface functions shown in FIG. 8 previously are no longer shown because they will never be used in a static system. For simplicity, the algControl( ) operation is not shown. The algControl( ) function may be called at any time after algInit( ).

As FIG. 25 illustrates, when a framework wants to execute an algorithm instance in a static system, it must first put the algorithm instance into a "start state". Since the memory for the instance has already been allocated, only initialization is required. In step 2501, algInit( ) is called to initialize the memory allocated to the instance at design time. The algorithm instance is now ready to execute. Execution of the algorithm instance is comprised of the four steps 2503, 2504, 2505, and 2506. In step 2503, the framework calls algActivate( ) to notify the algorithm instance that its memory is "active" and the algorithm instance processing functions in step 2504 may be called. The framework may then optionally (the option to skip or execute this step is denoted by arrows 2508) execute step 2504, calling algMoved( ) to allow the algorithm instance to update any internal references. This is only necessary when the framework has relocated the algorithm's instance object during system execution. Then, the framework may call any of the processing functions in the algorithm instance as denoted by step 2505. The framework may execute step 2505 repeatedly as necessary to accomplish the purpose of the algorithm. If the framework relocates the algorithm's instance object between executions of step 2505, it must repeat step 2504 before continuing.

Once the framework has finished using the processing functions of step 2505, it may proceed to step 2506. In step 2506, the algDeactivate( ) function is executed to notify the current algorithm instance that it is about to be deactivated. Once step 2506 is completed, the algorithm instance is back in its "start state." Only one option is available to the framework at this point, as designated by arrow 2509. It can reactivate the algorithm by executing the sequence described above starting with step 2503.

Note that there is no requirement that any of the steps shown in FIG. 25 must be performed in a single uninterrupted execution cycle by the framework. The order of execution shown must be followed but there is no requirement on how much time may elapse or what other things the framework might choose to do between performing the steps for a given algorithm instance.

Figure 26A:
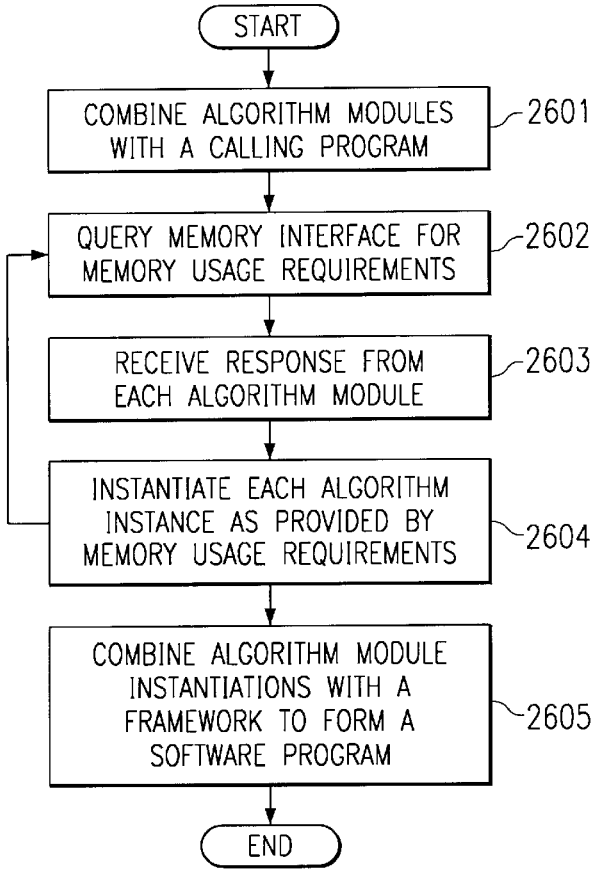
FIGS. 26A, 26B and 26C are flow graphs that, taken together, illustrate another embodiment of the present invention in which algorithm instances are instantiated at "design time" of a application program and all code for interfaces that will not be needed in a static system is excluded.

The steps to create an algorithm instance at "design time" are shown in the flowcharts in FIG. 26. In this embodiment, an algorithm module is instantiated and all code for interfaces that will not be needed in a static system is removed.

In the initial step, step 2601, the desired algorithm modules are combined with a calling program that implements an interface that allows it to query the memory interface of the algorithm modules with which it is combined. This embodiment assumes that the algorithm modules are implemented as described previously.

In steps 2602, 2603, and 2604, the result of step 2601 is executed. The calling program queries the memory interface of an algorithm module, receives a response from that algorithm module as to its instance's memory usage requirements, and then instantiates the instance of that algorithm. The instantiation consists of allocating the requested memory and initializing it so that the algorithm instance is ready to execute. These three steps are repeated for each algorithm instance.

After steps 2602–2604 are complete, the algorithm instantiations are combined with a framework to create a software program in step 2605. The resulting software program is then ready to be executed in a static embedded environment.

Figure 26B:
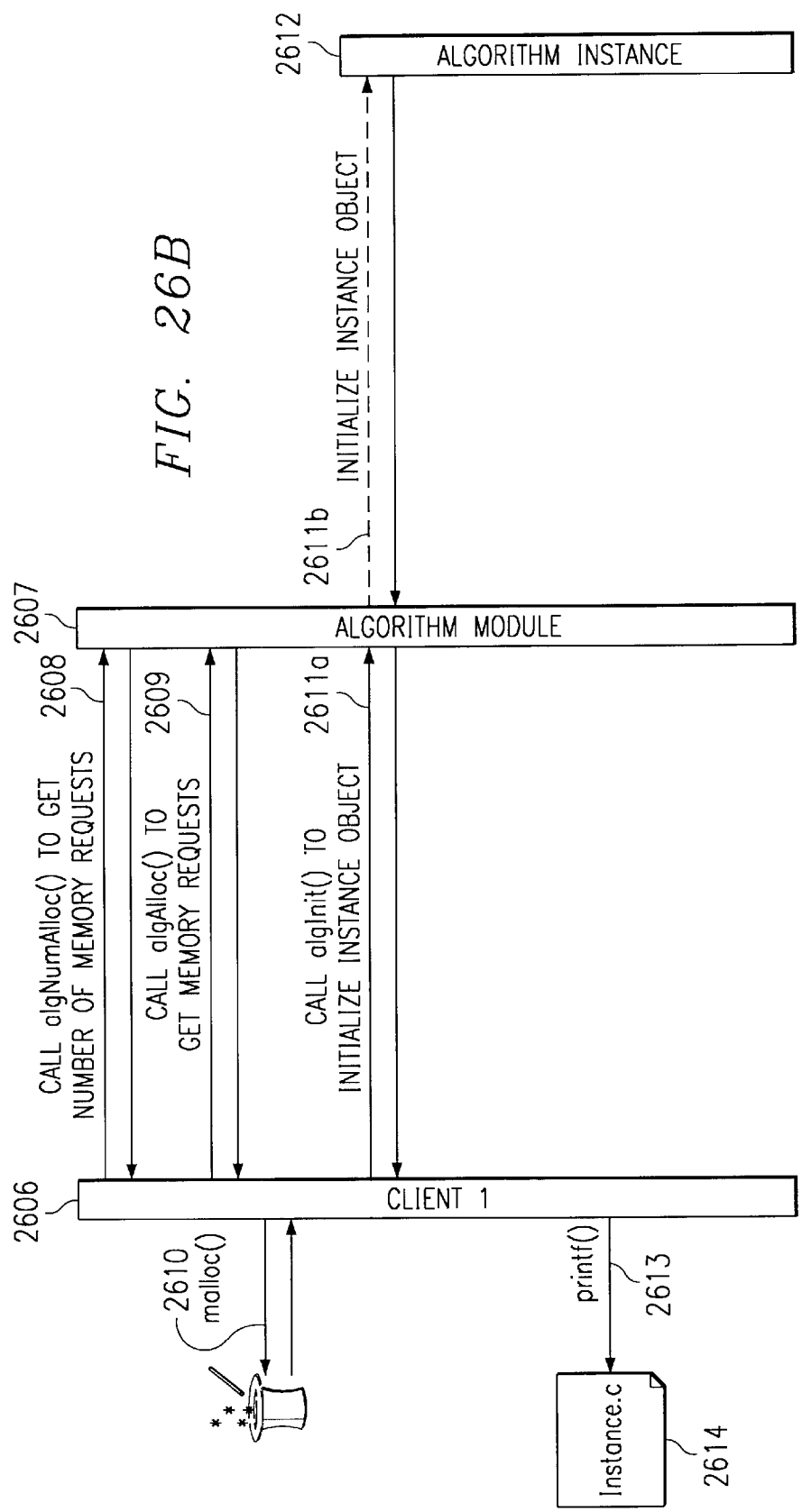
Figure 26C:
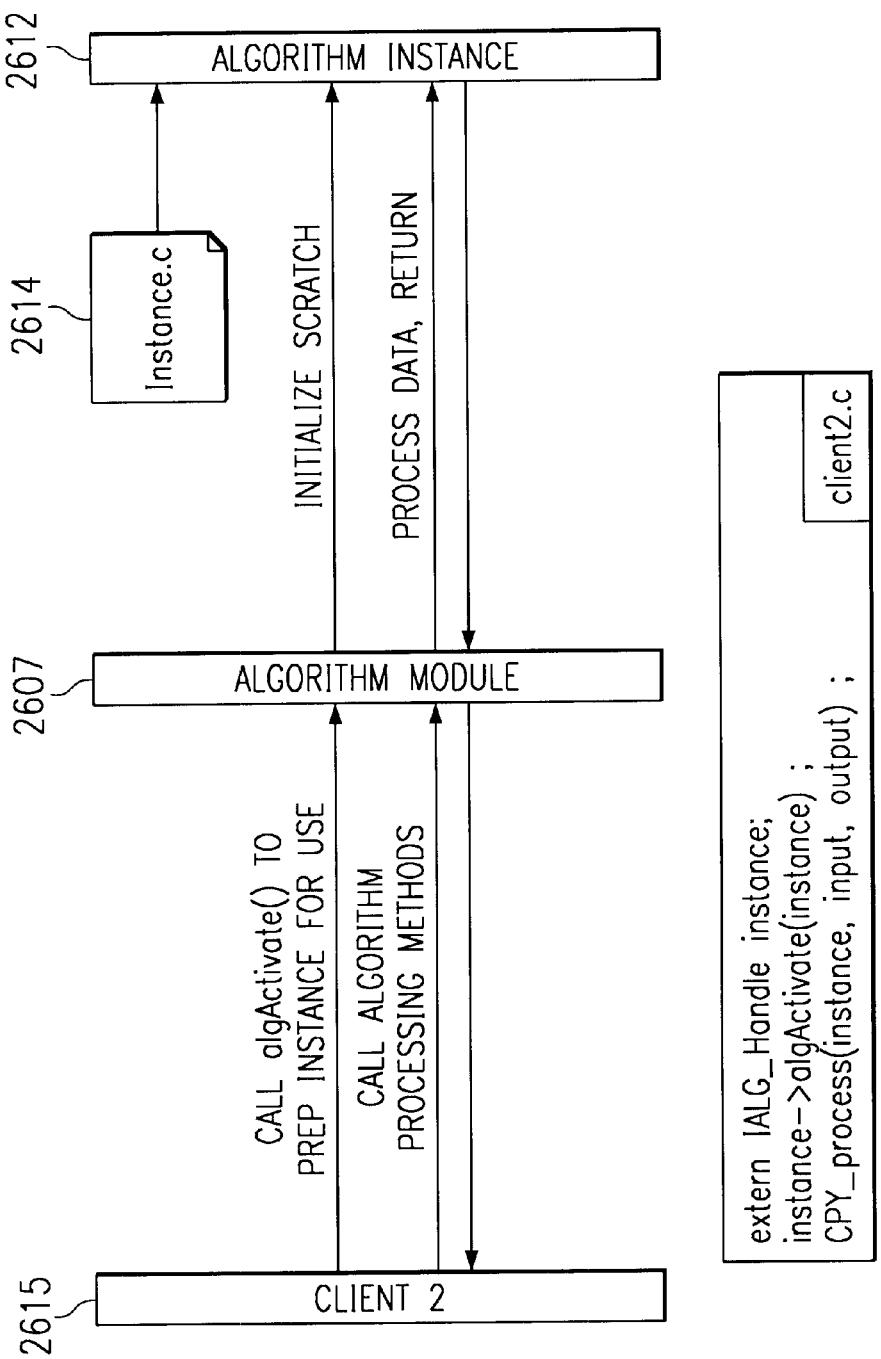

FIGS. 26B and 26C are flow graphs demonstrating an embodiment of the above method. In FIG. 26B, algorithm module 2607 has been linked with Client 1 2606 (the calling program) to form a software system. The resulting software system is executed to create an instance of the algorithm module as follows. (Note that the example assumes the algorithm module has been implemented with the memory interface described in an embodiment presented previously herein.)

In step 2608, client 1 2606 calls algNumAlloc( ) to get the number of memory requests the instance may make and algorithm module 2607 responds appropriately.

In step 2609, client 1 2606 calls algAlloc( ) to get the actual memory requests and algorithm module 2607 responds with the information requested.

In step 2610, client 1 2606 allocates memory for the algorithm instance based on the information it received in the two previous steps.

In step 2611a, client 1 2606 calls algInit( ) to initialize the instance object. In this call, it tells algorithm module 2607 where its memory block or blocks have been allocated. In step 2611b, the algorithm module causes the memory block or blocks that have been allocated to it to be initialized to create algorithm instance 2612. After step 2611b is executed, step 2611a is completed by algorithm module 2607 returning an indication of successful initialization to client 1 2606.

In step 2613, client 1 2606 creates output file 2614 that "declares" algorithm instance 2612 as static data. Output file 2614 is created to be appropriate input to a linker.

In FIG. 26C, output file 2614 has been linked with client 2615 to create a static software system. This static software system is now ready to be loaded on the target digital system.

In another embodiment, provisions are made for excluding unneeded module interface code to make the final software system smaller. As mentioned above, each function in a module should be created such that it can be independently manipulated during the process of combining the algorithm module with a calling program. In this embodiment, functions that are only required for run-time object creation are placed either in separate compilation units or in separate COFF (Common Object File Format) output sections that can be manipulated by the linker. Ideally, every function in the module interface should be in a separate compilation unit so the system integrator can eliminate any run-time support that is unnecessary for a static system.

One way this exclusion can be accomplished is to declare each function to be a code_section in a pragma directive. When the calling program is linked with the algorithm module, the link command file can contain directives such as those shown in Table 30 to cause any interface code that will not actually be executed in the final software system to be eliminated from the load module created.

TABLE 30

Excerpt from Link Command File

{
   ...
      .notUsed {
         * (.text:algActivate)
         * (.text:algApply)
         * (.text:algDeactivate)
         * (.text:algDelete)
         * (.text:algExit)
         * (.text:algInit)
         * (.text:algMoved)
         * (.text:algNumAlloc)
         type = NOLOAD > EXT3
         ...
      }
}

Note that in FIG. 26B, the functions algNumAlloc( ) and algAlloc( ) are present (see step 2608 and step 2609, respectively) in the load module created when client 1 2606 was linked with algorithm module 2607. In FIG. 26C, these functions are no longer present in the load module created when client 2 2615 is linked with object file 2614 containing the static representation of algorithm instance 2612. These functions will not be needed at run-time and the code that implemented them was excluded by the linker when the load module was created.

Figure 27:
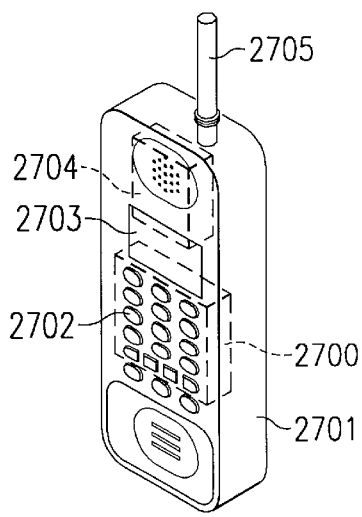
FIG. 27 is an example digital system that embodies the present invention, this example being a wireless telephone.

FIG. 27 illustrates an example digital system that embodies the present invention, this example being a generic wireless telephone. The digital system executes embedded software constructed according to the methods described herein. A DSP system as shown in FIG. 21 is packaged in an integrated circuit 2700 and included in wireless telephone 2701. Wireless telephone 2701 has integrated keyboard 2702 and display 2703. The DSP of FIG. 21 is connected to keyboard 2702, where appropriate via a keyboard adapter (not shown), to display 2703, where appropriate via a display adapter (not shown) and to radio frequency (RF) circuitry 2704. RF circuitry 2704 is connected to aerial 2705. Advantageously, by combining a frame work and a set of algorithm modules which embody the present invention and loading the resultant software program in the program memory of the digital system, signal processing algorithms can be written in a more efficient manner to satisfy the demand for enhanced wireless telephony functionality.

Typically, an application program is loaded onto the digital system at the time of manufacture by appropriate masking of a ROM within or connected to the digital system that contains an image of the application program or by programming or otherwise presetting the ROM, for example. Such an application program is referred to as an "embedded program" because the digital system is completely self-contained and is not connected to a mass storage device, as is common in a typical personal computer or workstation.

Thus, a system and method is provided for enabling the reuse of algorithms in multiple application frameworks with no alterations required of the algorithm once it is developed. A standardized interface (IALG) is included within each algorithm module that supports an inverted memory protocol so that each algorithm module can inform an application program of the memory usage requirements for each instance of the module. The application program, or framework, then allocates memory from a pool managed by the framework.

Advantageously, various application programs can uniformly manipulate all algorithms that provide an IALG interface.

Advantageously, all memory allocation is removed from the algorithm modules. This enables dynamic "open" systems as well as tiny footprint embedded systems or any combination thereof.

Advantageously, only three methods must be implemented: algAlloc—return all memory allocation requests to application; algFree—return pointers to all instance memory; and algInit—initialize allocated instance memory.

Advantageously, multiple implementations of a same algorithm can co exist by using a "v-table" to access functions.

Advantageously, object creation can be performed in a non-real-time manner. Object creation code can be overlaid and reused.

Advantageously, an activate-deactivate model allows performance and code space optimizations.

While the invention has been described with reference to illustrative embodiments, this description should not be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A method for managing memory usage in a software program having a framework and a plurality of algorithm modules, the method comprising the steps of:
   combining the plurality of algorithm modules with the framework to form the software program, wherein each of the plurality of algorithm modules has a memory interface which responds to a memory allocation inquiry with memory usage requirements of an instance of the algorithm module;

loading the software program on a hardware platform; and executing the software program on the hardware platform, wherein the step of executing comprises the steps of:

sending a query from the framework to the memory interface of each of the plurality of algorithm modules to request memory usage requirements for each instance of each of the plurality of algorithm modules;

receiving a response from the memory interface of each algorithm module identifying memory usage requirements for each instance of the algorithm module; and allocating a portion of memory to each algorithm module to instantiate each instance in accordance with the memory usage requirements identified by the memory interface of each algorithm module, whereby each instance of the plurality of algorithm modules is instantiated and allocated memory dynamically.

2. The method of claim 1, further comprising the steps of:

initializing a first region of memory allocated by the framework to a first algorithm module under direction of the memory interface of the first algorithm module;

executing a first algorithm in a first instance of the first algorithm module in a manner that only the first memory region is used for data memory accesses.

3. The method of claim 2, further comprising the steps of:

releasing the first region of memory after the step of executing the first algorithm is complete in response to a directive from the framework; and reclaiming and reusing the first region of memory after it is released by the first memory interface of the first algorithm module.

4. The method of claim 2, further comprising the steps of:

relocating the first algorithm module from a first location to a second location; and re-computing all internal data references within the first algorithm module to the first memory region to correspond with the second location.

5. The method of claim 1, wherein the step of receiving a response comprises defining two or more types of memory usage requirements.

6. The method of claim 1, wherein the step of receiving a response comprises defining at least one type of memory usage requirement, and wherein the step of allocating a portion of memory allocates a different type of memory.

7. The method of claim 1, wherein the step of receiving a response informs the framework that at least a first portion of the required memory must be persistent memory and a second portion may be shared scratch memory.

8. The method of claim 7, further comprising the step of sending a directive from the framework to a first algorithm module directing the first algorithm module to activate itself by copying certain data from a first portion of persistent memory allocated to the first algorithm module to shared scratch memory, such that the first algorithm module uses shared scratch memory during execution of the first algorithm.

9. The method of claim 8, further comprising the step of sending a directive from the framework to the first algorithm module directing the first algorithm module to deactivate itself by copying certain resultant data from the shared scratch memory to the first portion of persistent memory.

10. The method of claim 1, wherein the step of receiving a response informs the framework that at least a portion of the required memory must be in a particular memory space.

11. A software development system, comprising:

a host digital system;

a target digital system; and an access adaptor operatively connecting the host digital system and the target digital system wherein the host digital system is operable to create a software program comprising:

a plurality of algorithm modules each of which include a memory interface, wherein the memory interface is operable to respond with a memory usage requirements of the algorithm when the memory interface is queried by a framework; and a framework linked to each of the plurality of algorithms, wherein the framework is operable to query the memory interface in each of the plurality of algorithms modules, such that when the software program is loaded and executed on a hardware platform, execution comprises the steps of:

sending a query from the framework to the memory interface of each of the plurality of algorithm modules to request memory usage requirements for each instance of each of the plurality of algorithm modules;

receiving a response from the memory interface of each algorithm module identifying memory usage requirements of each instance of the algorithm module; and allocating a portion of memory to each algorithm module to instantiate each instance in accordance with the memory usage requirement identified by the memory interface of each algorithm module; and the target digital system is operable to receive and execute the software program.

12. A method for managing memory usage in a software program having a framework and a plurality of algorithm modules, wherein for a given one of the plurality of algorithm modules the method comprises the steps of:

encapsulating an algorithm instruction code section with a memory interface code section to form an algorithm module;

responding to a memory allocation inquiry to the memory interface with a memory usage requirement for an instance of the algorithm module; and accepting an allocation of a first region of memory in response to the memory allocation inquiry and adjusting relative addresses within the algorithm instruction code section so that data memory accesses are performed by the algorithm instruction code in the first region of memory.

13. The method of claim 12, further comprising the steps of:

initializing the first region of memory allocated by the framework under direction of the memory interface; and executing the algorithm instructions in a first instance of the algorithm module in a manner that only the first region of memory is used for data memory accesses.

14. The method of claim 13, further comprising the steps of:

relocating the algorithm module from a first location to a second location; and re-computing all internal data references within the first algorithm module to the first region of memory to correspond with the second location.

15. The method of claim 13, further comprises the step of receiving a directive from the framework directing the algorithm module to activate itself by copying certain data from a portion of persistent memory allocated to the algorithm module to shared scratch memory, such that the algorithm module uses shared scratch memory during execution of the first algorithm.

16. The method of claim 15, further comprising the step of receiving a directive from the framework directing the algorithm module to deactivate itself by copying certain resultant data from the shared scratch memory to the portion of persistent memory allocated to the algorithm module.

17. A digital system, comprising:
a microprocessor with a central processing unit (CPU);
a non-volatile program memory connected to the CPU;
a data memory connected to the CPU; and
a program stored in the nonvolatile memory, the program comprising:
a plurality of algorithm modules each of which include a memory interface, wherein the memory interface is operable to respond with a memory usage requirements of the algorithm when the memory interface is queried by a framework; and
a framework linked to each of the plurality of algorithms, wherein the framework is operable to query the memory interface in each of the plurality of algorithms modules, such that when the software program is executed by the CPU, execution comprises the steps of:
sending a query from the framework to the memory interface of each of the plurality of algorithm modules to request memory usage requirements for each instance of each of the plurality of algorithm modules;
receiving a response from the memory interface of each algorithm module identifying memory usage requirements of each instance of the algorithm module; and
allocating a portion of memory to each algorithm module to instantiate each instance in accordance with the memory usage requirement identified by the memory interface of each algorithm module.

18. The digital system of claim 17, wherein the data memory comprises a first type of memory and a second type of memory, and wherein the step of sending a response informs the framework that at least a portion of the required memory must be in a particular one of the first type of memory or the second type of memory.

19. The digital system of claim 17 being a cellular telephone, further comprising:
an integrated keyboard connected to the CPU via a keyboard adapter;
a display, connected to the CPU via a display adapter;
radio frequency (RF) circuitry connected to the CPU; and
an aerial connected to the RF circuitry.

* * * * *